US008009237B2

(12) United States Patent
Jeong et al.

(10) Patent No.: US 8,009,237 B2
(45) Date of Patent: Aug. 30, 2011

(54) DISPLAY SUBSTRATE, METHOD FOR MANUFACTURING THE SAME, AND DISPLAY PANEL HAVING THE SAME

(75) Inventors: Youn-Hak Jeong, Cheonan-si (KR);
Keun-Chan Oh, Cheonan-si (KR);
Yeon-Sik Ham, Suwon-si (KR);
Dong-Gi Seong, Seongnam-si (KR);
Kang-Woo Kim, Seoul (KR);
Yeon-Mun Jeon, Iksan-si (KR);
Hee-Hwan Lee, Busan (KR)

(73) Assignee: Samsung Electronics Co., Ltd. (KR)

( * ) Notice: Subject to any disclaimer, the term of this patent is extended or adjusted under 35 U.S.C. 154(b) by 310 days.

(21) Appl. No.: 12/436,646

(22) Filed: May 6, 2009

(65) Prior Publication Data

US 2010/0134741 A1  Jun. 3, 2010

(30) Foreign Application Priority Data

Dec. 2, 2008  (KR) .................. 10-2008-0120844

(51) Int. Cl.
*G02F 1/1335* (2006.01)
*G02F 1/1343* (2006.01)
*G02F 1/13* (2006.01)

(52) U.S. Cl. ..................... 349/12; 349/139; 349/149

(58) Field of Classification Search .............. 349/12, 349/139, 149, 199
See application file for complete search history.

(56) References Cited

U.S. PATENT DOCUMENTS

| 7,649,578 | B2 * | 1/2010 | Kwon et al. | 349/12 |
|---|---|---|---|---|
| 7,719,634 | B2 * | 5/2010 | Lee et al. | 349/72 |
| 2006/0109222 | A1 * | 5/2006 | Lee et al. | 345/88 |
| 2009/0180043 | A1 * | 7/2009 | Rho et al. | 349/12 |
| 2009/0207332 | A1 * | 8/2009 | Zhang et al. | 349/43 |

FOREIGN PATENT DOCUMENTS

| JP | 2007-047851 | 2/2007 |
|---|---|---|
| KR | 2007-0067960 | 6/2007 |
| KR | 2008-0045381 | 5/2008 |

OTHER PUBLICATIONS

Englist abstract for publication No. KR 2007-0067960.
Englist abstract for publication No. KR 2008 0045381.
Englist abstract for publication No. JP 2007-047851.

* cited by examiner

*Primary Examiner* — Rhonda S Peace
(74) *Attorney, Agent, or Firm* — Innovation Counsel LLP

(57) ABSTRACT

A gate line and a data line are formed on a base substrate. A first sensor line is parallel with the gate line. A sensor gate electrode is extended from the first sensor line. A sensor active pattern having a plurality of island-type sub-active members is formed on the first sensor gate electrode. A second sensor line is parallel with the data line. A first sensor drain electrode is extended from the second sensor line at the sensor active pattern. A second sensor drain electrode corresponding to the first sensor gate electrode is formed on the sensor active pattern. A pixel electrode is electrically connected to the gate line and the data line. A sensor electrode part electrically connects the first and second sensor drain electrodes spaced apart from the pixel electrode. Light is reflected by the first and second sensor drain electrodes, which have an embossed shape.

20 Claims, 19 Drawing Sheets

A FIRST DIRECTION ←─┼─
                   ↓
         A SECOND DIRECTION

A FIRST DIRECTION

A SECOND DIRECTION

A FIRST DIRECTION

A SECOND DIRECTION

FIG. 11
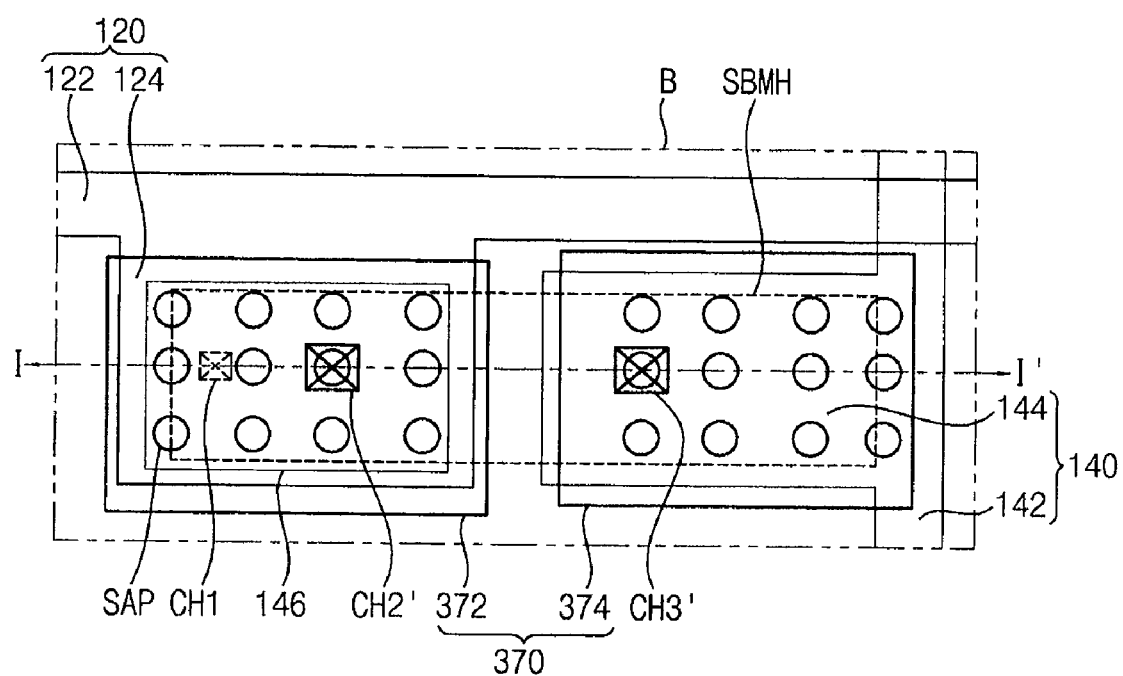
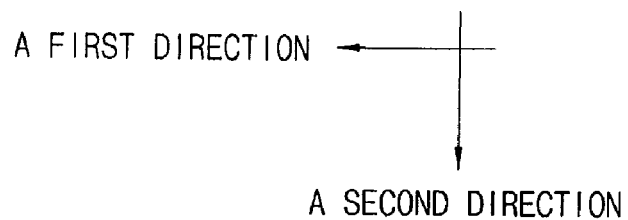

FIG. 18
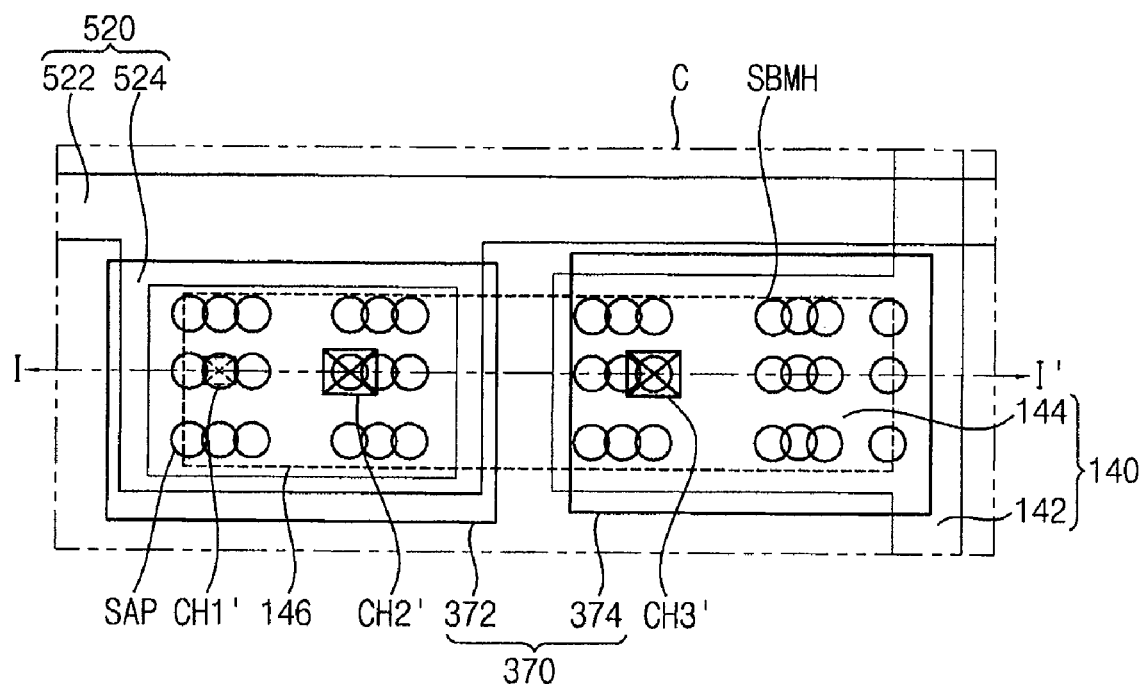
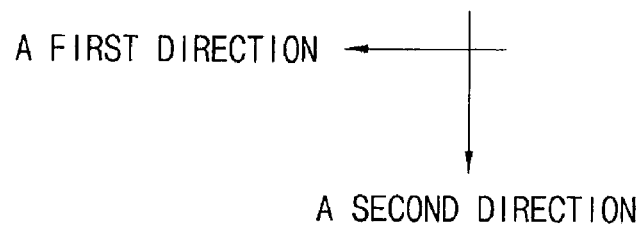
A FIRST DIRECTION
A SECOND DIRECTION

DISPLAY SUBSTRATE, METHOD FOR MANUFACTURING THE SAME, AND DISPLAY PANEL HAVING THE SAME

CROSS REFERENCE TO RELATED APPLICATIONS

This application claims priority under 35 U.S.C. §119 to Korean Patent Application No. 2008-120844, filed on Dec. 2, 2008 in the Korean Intellectual Property Office (KIPO), the contents of which are herein incorporated by reference in their entirety.

BACKGROUND

1. Technical Field

The present invention generally relates to a display substrate, a method for manufacturing the display substrate, and a display panel having the same. More particularly, the present invention relates to a display substrate that may provide enhanced display quality, a method for manufacturing the display substrate, and a display panel having the same.

2. Related Art

Liquid crystal display (LCD) devices are known to have characteristics—such as light weight, lower power consumption, and lower driving voltage—in comparison with other types of display apparatuses, rendering them useful, for example, in monitors, notebook computers, and cellular phones. A typical LCD device includes an LCD panel displaying images using the light transmissivity of liquid crystal molecules and a backlight assembly disposed below the LCD panel to provide the LCD panel with light. The LCD panel includes an array substrate, a counter substrate and a liquid crystal layer. The array substrate includes a signal line, a thin-film transistor (TFT), and a pixel electrode. The counter substrate faces the array substrate and includes a common electrode. The liquid crystal layer is interposed between the array substrate and the counter substrate.

The LCD panel may have a touch panel function capable of receiving position data through external pressure. That is, when an electronic pen or a finger touches the screen of the LCD panel, a position data signal may be applied to a central processing unit (CPU) of a main system. The LCD panel further includes a sensor line and a sensor electrode part to perform the touch panel function. Particularly, the sensor line is formed on the array substrate and is spaced apart from the signal line, and the sensor electrode part is formed in a unit pixel to be electrically connected to the signal line. When the common electrode makes contact with the sensor electrode part by applying external pressure to the counter substrate, position data corresponding to the contact position is provided to the CPU through the sensor line to perform an operation.

When the sensor electrode part is formed in the unit pixel, however, an aperture ratio of the LCD panel is decreased by the size of the sensor electrode part, which causes a decrease in luminance.

SUMMARY

Example embodiments of the present invention may provide a display substrate capable of enhancing light reflection efficiency. Also, embodiments of the present invention provide a method for manufacturing the display substrate and a display panel having the display substrate.

According to one embodiment of the present invention, a display substrate includes a base substrate on which a gate line and a data line is formed, a first sensor line parallel with the gate line, a first sensor gate electrode extended from the first sensor line, a sensor active pattern having a plurality of island-type sub-active members, and formed on the first sensor gate electrode, a second sensor line parallel with the data line, a first sensor drain electrode extended from the second sensor line on the sensor active pattern, a second sensor drain electrode corresponding to the first sensor gate electrode on the sensor active pattern, a pixel electrode electrically connected to the gate line and the data line and a sensor electrode part connecting the first and second sensor drain electrodes with each other.

According to an embodiment of the present invention, the display substrate may further include a gate insulation layer and a protective layer. The gate insulation layer covers the gate line, the first sensor line and the first sensor gate electrode. The protective layer covers the data line which is formed on the gate insulation layer, the second sensor line, the first sensor drain electrode and the second sensor drain electrode, and is disposed at a lower portion of the pixel electrode and the sensor electrode part. According to an embodiment of the present invention, the display substrate may further include a common electrode and an electrode insulation layer. The common electrode is formed on the protective layer and the common electrode and the electrode insulation layer are disposed between the pixel electrode and the protective layer, and between the sensor electrode part and the protective layer. The electrode insulation layer is formed on the common electrode. The protective layer may be a color filter layer. The protective layer may have an embossed shape. According to an embodiment of the present invention, the display substrate may further include a second sensor gate electrode having a plurality of island-type sub-gate members corresponding to the first sensor drain electrode. The first sensor gate electrode may have a plurality of island-type sub-gate members. According to an embodiment of the present invention, the first sensor line includes a first sensor main line formed along a first direction substantially parallel with the gate line and the first sensor gate electrode protruding from the first sensor main line along a second direction substantially parallel with the data line, the second direction being substantially perpendicular to the first direction; and the second sensor line includes a second sensor main line formed along the second direction and the first sensor drain electrode protruding from the second sensor main line along the first direction to face the first sensor gate electrode. The sensor electrode part may include a first sensor electrode electrically connected to the first sensor line and a second sensor electrode electrically connected to the second sensor line. The first sensor electrode and the second sensor electrode, respectively, have at least one layer. The display substrate may include a common electrode formed on the data line and insulated from the pixel electrode. A plurality of slits may be formed through the pixel electrode disposed over the common electrode to partially expose the common electrode.

According to an embodiment of the present invention, a method of manufacturing a display substrate includes forming a gate line, a first sensor line parallel with the gate line, and a first sensor gate electrode extended from the first sensor line; forming a sensor active pattern having a plurality of island-type sub-active members on a base substrate on which the first sensor gate electrode is formed; forming a second sensor line, a first sensor drain electrode and a second sensor drain electrode, the second sensor line parallel with the data line, the first sensor drain electrode formed on the sensor active pattern and extended from the second sensor line, and the second sensor drain electrode formed on the sensor active pattern and corresponding to the first sensor gate electrode; and forming a pixel electrode and a sensor electrode part, the pixel electrode electrically connected to the gate line and the data line, the sensor electrode part electrically connecting the first and second sensor drain electrodes with each other.

According to an embodiment of the present invention, a display panel includes a display substrate, a counter substrate and a liquid crystal layer. The display substrate includes a base substrate on which a gate line and a data line are formed, a first sensor line parallel with the gate line, a first sensor gate electrode extended from the first sensor line, a sensor active pattern having a plurality of island-type sub-active members, and formed on the first sensor gate electrode, a second sensor line parallel with the data line, a first sensor drain electrode formed on the sensor active pattern and extended from the second sensor line, a second sensor drain electrode formed on the sensor active pattern and corresponding to the first sensor gate electrode, a pixel electrode electrically connected to the gate line and the data line, and a sensor electrode part spaced apart from the pixel electrode, and electrically connecting the first and second sensor drain electrodes with each other. The counter substrate faces the display substrate; and the liquid crystal layer is disposed between the display substrate and the counter substrate.

The counter substrate may include a sensor protrusion protruding toward the sensor electrode part, a sensor protrusion electrode covering the sensor protrusion, and a light-blocking layer partially formed on the counter substrate. The sensor protrusion electrode may be a transparent electrode. A plurality of holes may be formed through the light-blocking layer, and an area of the counter substrate corresponding to the first sensor gate electrode, and the first and second sensor drain electrodes may be removed to form the holes. A dummy part may be formed by an extended part of the gate line. According to an embodiment of the present invention, the dummy part may include a dummy gate electrode formed by the extended gate line, a dummy active pattern having a plurality of island-type sub-active members and formed on the dummy gate electrode, and a dummy drain electrode formed on the dummy active pattern. The light-blocking layer may have holes formed by removing an area of the counter substrate corresponding to the dummy gate electrode and the dummy drain electrode.

According to one or more embodiments—the display substrate, the method for manufacturing the display substrate, and the display panel having the display substrate—the first and second sensor drain electrodes and a dummy drain electrode have an embossed shape, and thus external visibility may be enhanced by increased light reflection efficiency.

BRIEF DESCRIPTION OF THE DRAWINGS

The present invention will become more apparent by describing detailed example embodiments thereof with reference to the accompanying drawings, in which:

FIG. 11 is an enlarged plan view illustrating a sensor part B in FIG. 10 according to an embodiment;

FIG. 18 is an enlarged plan view illustrating a sensor part C in FIG. 17 according to an embodiment;

DETAILED DESCRIPTION

Figure 1:
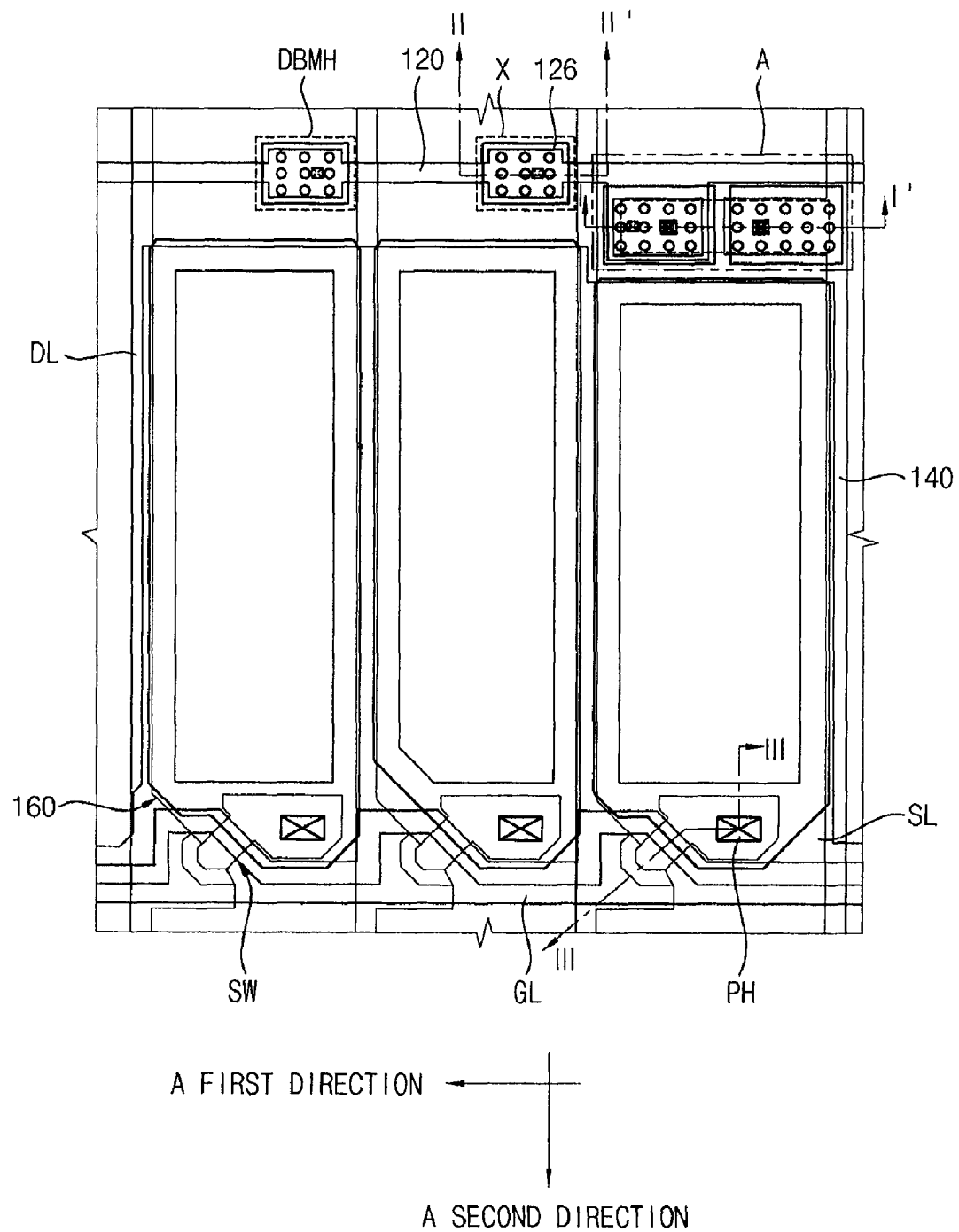
FIG. 1 is a plan view partially illustrating a display panel according to a first example embodiment.

Embodiments of the present invention are described more fully hereinafter with reference to the accompanying drawings, in which example embodiments of the present invention are shown and described. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referring to as being "on," "connected to" or "coupled to" another element or layer, it can be directly on, connected or coupled to the other element or layer or intervening elements or layers may be present. In contrast, when an element is referring to as being "directly on," "directly connected to," or "directly coupled to" another element or layer, there are no intervening elements or layers present. Like numerals refer to like elements throughout. As used herein, the term "and/or" includes any and all combinations of one or more of the associated listed items. It will be understood that, although the terms first, second, third, etc. may be used herein to describe, for example, various elements, components, regions, layers and/or sections, these elements, components, regions, layers and/or sections should not be limited by these terms. These terms may be used only to distinguish one element, component, region, layer or section from another element, component, region, layer or section. Thus, a first element, component, region, layer or section discussed below could be termed a second element, component, region, layer or section without departing from the teachings of the present invention. Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence, for example, of stated features, integers, steps, operations, elements, and/or components, but do not preclude the presence or addition of one or more other features, integers, steps, operations, elements, components, and/or groups thereof. Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example One

Figure 2:
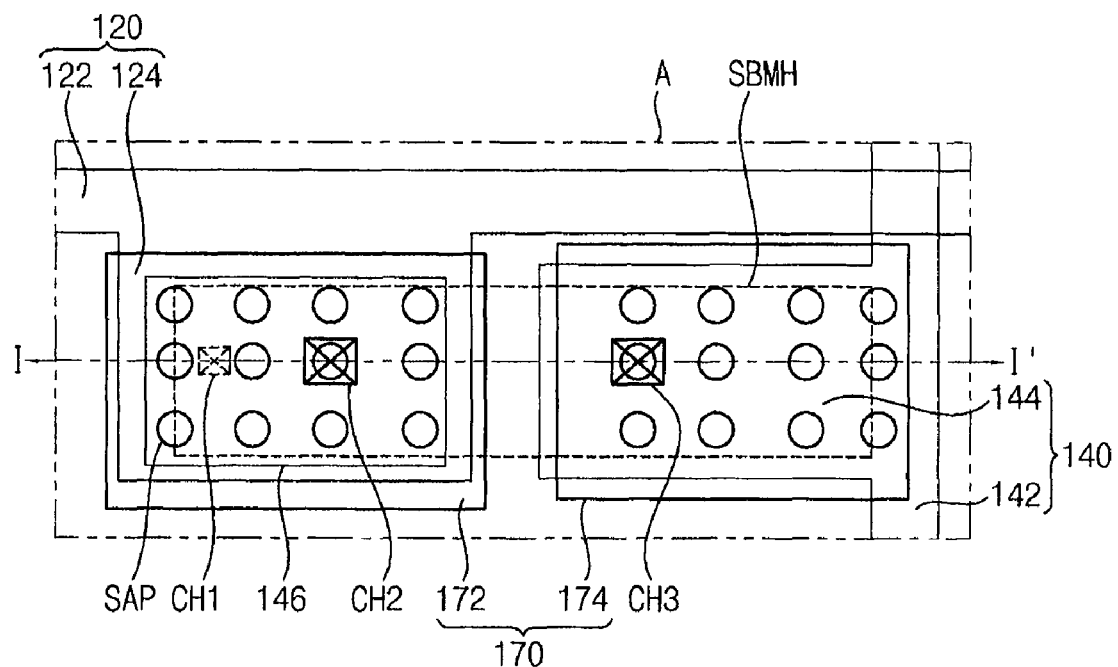
FIG. 2 is an enlarged plan view of a sensor part A in FIG. 1 according to an embodiment.

FIG. 1 is a plan view illustrating a part of a display panel according to an embodiment; FIG. 2 is a plan view magnifying a sensor part A in FIG. 1; and FIG. 3 is a cross-sectional view taken along a line I-I' of a sensor part A in FIG. 1 in accordance with one or more embodiments.

Figure 3:
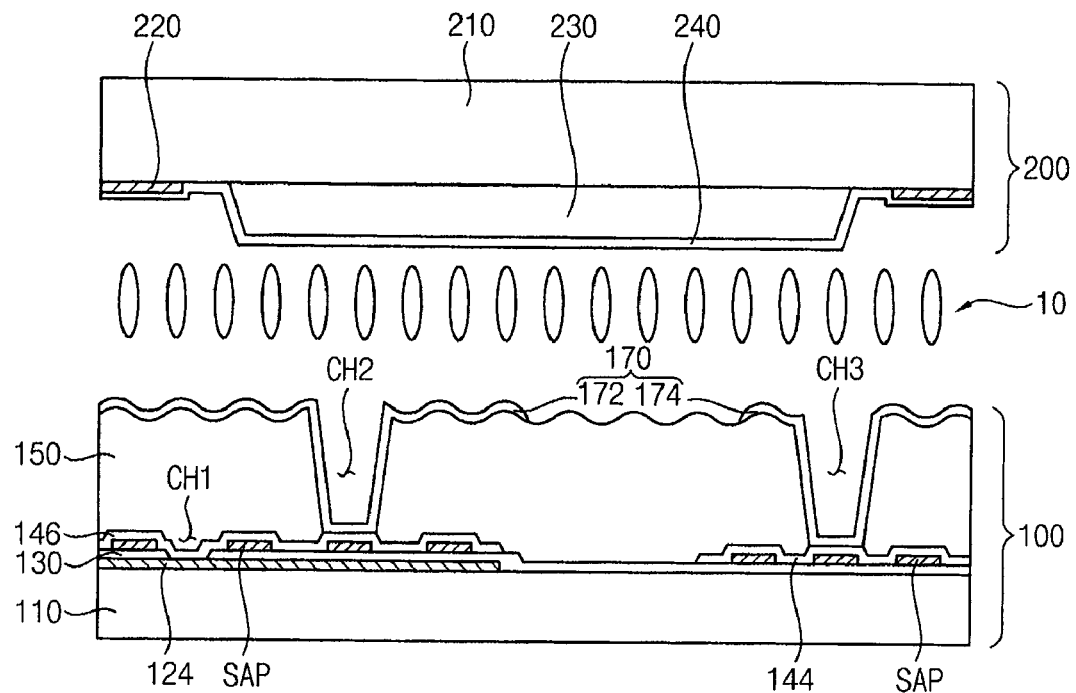
FIG. 3 is a cross-sectional view taken along a line I-I' of the sensor part A in FIG. 1 according to an embodiment.

Referring to FIGS. 1 through 3, the display panel according to an embodiment includes a display substrate 100, a counter substrate 200, and a liquid crystal layer 10; and displays an image to the exterior. The display substrate 100 includes pixel electrodes 160 disposed as a matrix forming, thin-film transistors (TFTs) SW electrically connected to the pixel electrodes 160, and gate lines GL and data lines DL electrically connected to the TFTs SW. The plurality of gate lines GL and data lines DL are formed in directions that cross each other, and define a plurality of unit regions on the display substrate 100. A part of the unit regions have a sensor part A sensing a position of pressure from the exterior. A part of the unit regions have a dummy part X reflecting light.

The counter substrate 200 faces the display substrate 100, and includes a light-blocking film 220 and a common electrode 240 at which a common voltage is applied.

The liquid crystal layer 10 is disposed between the display substrate 100 and the counter substrate 200, and is realigned by an electric field formed between the display substrate 100 and the counter substrate 200. Thus, if light is applied from the exterior, the transmittance of light is controlled by the liquid crystal layer 10, an image is displayed to the exterior.

The sensor part A is now described according to an embodiment. The display substrate 100 includes a first base substrate 110, a gate line GL, a storage line SL, a first sensor line 120, a gate insulation layer 130, a data line DL, a TFT SW, a second sensor line 140, a color filter 150, a pixel electrode 160 and a sensor electrode part 170. The first base substrate 110, having a plate shape, may be comprised of a transparent material, for example, glass, quartz and synthetic resins. The gate line GL, the storage line SL and the first sensor line 120 are formed on the first base substrate 110.

The first sensor line 120 includes a first sensor main line 122 and a first sensor gate electrode 124. The first sensor main line 122, extending in a first direction, is spaced apart from the gate line GL. The first sensor gate electrode 124 protrudes from the first sensor main line 122 in a direction crossing the first direction, may protrude parallel to the data line DL, and may protrude in a direction perpendicular to the first direction. The first sensor gate electrode 124 has a substantially rectangular shape.

The gate insulation layer 130 is formed on the gate line GL, the storage line SL and the first sensor line 120. The data line DL and the second sensor line 140 are formed on the gate insulation layer 130. A plurality of data lines DL are formed on the gate insulation layer 130 in a second direction crossing the first direction of the gate line GL. The second direction may be perpendicular to the first direction. The second sensor line 140, spaced apart from the data line DL, is formed in parallel with the data line DL. A plurality of second sensor lines 140 are formed in the second direction. The second sensor line 140 may be formed one for every six data lines DL. The second sensor line 140 includes a second sensor main line 142 formed in the second direction and a first sensor drain electrode 144 protruding from the second sensor main line 142 in a direction crossing the second direction. The first sensor drain electrode 144 may protrude from the second sensor main line 142 in a direction perpendicular to the second direction.

A sensor active pattern SAP having a plurality of island type sub-active members is formed at a lower portion of the first sensor drain electrode 144. The first sensor drain electrode 144 may have an embossed shape by the sensor active pattern SAP (e.g., the embossed shape being conformal to the SAP shape). A second sensor drain electrode 146 spaced apart from the first sensor drain electrode 144 is formed corresponding to the first sensor gate electrode 124. The second sensor drain electrode 146 is electrically connected to the first sensor gate electrode 124 through a first contact hole CH1 formed at the gate insulation layer 130. The sensor active pattern SAP is formed on the gate insulation layer 130 corresponding to the first sensor gate electrode 124. The second sensor drain electrode 146 may have an embossed shape by the sensor active pattern SAP.

The color filter 150 may be formed on the data line DL and the second sensor line 140. A plurality of color filters 150 corresponding to the sensor electrode 170 may have an embossed shape. The color filter 150 may include a red color filter, a green color filter and a blue color filter. According to one embodiment, the color filter 150 is shown, but the data line DL, the second sensor line 140, the second sensor drain electrode 146, an inorganic protective layer covering the TFT SW and an organic protective layer formed on the inorganic protective layer may be used instead of the color filter 150.

The pixel electrode 160 and the sensor electrode part 170 are formed on the color filter 150. The sensor electrode part 170, spaced apart from the pixel electrode 160, is formed on the color filter 150. The sensor electrode part 170 is formed at a part of the unit regions, and is electrically connected to the first sensor line 120 and the second sensor line 140. For example, the sensor electrode part 170 may be spaced apart from the pixel electrode 160 in a second direction, which is a long axis of the unit region. The sensor electrode part 170 is formed at a position where the first sensor line 120 and the second sensor line 140 cross each other.

The sensor electrode part 170 is formed on the color filter, having an embossed shape, and is comprised of a transparent conductive material similar to that of the pixel electrode. The sensor electrode part 170 includes a first main electrode 172 electrically connected to the first sensor line 120 and a second main electrode 174 electrically connected to the second sensor line 140. The first sensor main electrode 172 is formed on the color filter 150 to overlap with the first sensor gate electrode 124, and is electrically connected to the second sensor drain electrode 146 through a second contact hole CH2 formed at the gate insulation layer 130. The first sensor main electrode 172 may have a rectangular shape, an area covering the first sensor gate electrode 124. The second sensor main electrode 174 is formed on the color filter 150, having an embossed shape, to overlap with the first sensor drain electrode 144, and is electrically connected to the first sensor drain electrode 144 through a third contact hole CH3 formed on the color filter 150. The second sensor main electrode 174 may have a rectangular shape. The first sensor main electrode 172 and the second sensor main electrode 174 may have an extended shape along an imaginary reference line parallel to the first direction.

The unit region where the sensor electrode part 170 is not formed is defined as a first unit region, the unit region where the sensor electrode 170 is formed is defined as a second unit region. The pixel electrodes 160 include a first pixel electrode 162 formed at the first unit region and a second pixel electrode 164 formed at the second unit region. The first pixel electrode 162 and the second pixel electrode 164 may have areas that are different from each other.

The counter substrate 200 includes a second base substrate 210, a light-blocking layer 220, a sensor protrusion 230 and a common electrode 240. The second base substrate 210, facing the first base substrate 110, has a plate shape. The second base substrate 210 may be comprised of transparent glass, quartz and synthetic resins as with the first base substrate 110. The light-blocking layer 220 is formed at one side of the second base substrate 210, facing the first base substrate 110. For example, the light-blocking layer 220 may be formed to cover the gate line GL, the data line DL, the first sensor line 120, the second sensor line 140, the storage line SL, and the TFT SW.

The sensor protrusion 230 has an extended shape in a first direction, which is a longitudinal direction of the sensor electrode part 170. The sensor protrusion 230 has a protrusive shape toward the display substrate 100. A sensor light-blocking layer hole SBMH is formed by removing the light-blocking layer 220 at a region where the sensor protrusion 230 is formed. Therefore, incident light from the exterior is reflected by the first sensor drain electrode 144 and the second sensor drain electrode 146, so external visibility of the display panel may be enhanced. The common electrode 240 covers the light-blocking layer 220 and the sensor protrusion 230. A common voltage is applied to the common electrode 240. If external pressure is applied to the sensor part A, the common electrode 240 may make electrical contact with the first and second sensor main electrode 170 (172, 174), so the common voltage moves to the exterior sensor driver (not shown) through the first and second sensor lines 120, 140.

Figure 4:
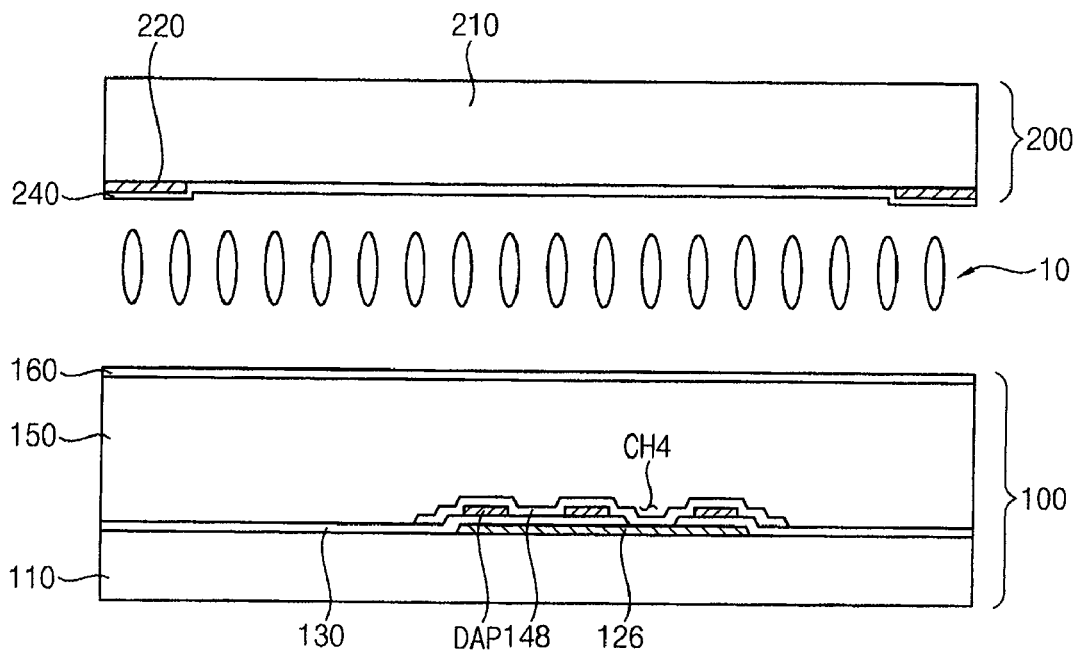
FIG. 4 is a cross-sectional view taken along a line II-II' of a dummy part X in FIG. 1 according to an embodiment.

FIG. 4 is a cross-sectional view taken along a line II-II' of the dummy part X in FIG. 1. Referring to FIGS. 1 and 4, the display substrate 100 includes a first base substrate 110, a first sensor line 120, a gate insulation layer 130, a data line DL, a second sensor line 140, a color filter 150 and a pixel electrode 160. The first base substrate 110 has a plate shape, and may be comprised, for example, of transparent glass, quartz and synthetic resins. The gate line GL and the first sensor line 120 are formed on the first base substrate 110. A dummy gate electrode 126 which is the extended shape of the first sensor line 120 is formed corresponding to the dummy part X.

The gate insulation layer 130 is formed on the gate line GL, the first sensor line 120 and the dummy gate electrode 126. The data line DL and the second sensor line 140 are formed on the gate insulation layer 130. A dummy drain electrode 148 is formed corresponding to the dummy gate electrode 126. The dummy drain electrode 148 is electrically connected to the dummy gate electrode 126 through a fourth contact hole CH4 formed at the gate insulation layer 130. A dummy active pattern DAP having a plurality of island type sub-active members is formed on the gate insulation layer 130 corresponding to the dummy gate electrode 126. The dummy drain electrode 148 may have an embossed shape by the dummy active pattern DAP.

The color filter 150 is formed on the data line DL, the second sensor line 140 and the dummy drain electrode 148. The pixel electrode 160 is formed on the color filter 150.

The counter substrate 200 includes a second base substrate 210, a light-blocking layer 220 and a common electrode 240. The second base substrate 210, facing the first base substrate 110, has a plate shape. The second base substrate 210 may be comprised, for example, of transparent glass, quartz and synthetic resins, similar to the first base substrate 110. The light-blocking layer 220 is formed at one side of the second base substrate 210, facing the first base substrate 110. For example, the light-blocking layer 220 may be formed to cover the gate line GL, the data line DL, the first sensor line 120, the second sensor line 140 and the storage line SL. The light-blocking layer 220 may have a dummy light-blocking layer hole DBMH formed by removing a part of the dummy part X. Therefore, incident light from the exterior is reflected by the dummy drain electrode 148 having an embossed shape, so external visibility of the display panel may be enhanced. The common electrode 240 covers the light-blocking layer 220. A common voltage is applied to the common electrode 240.

Figure 5:
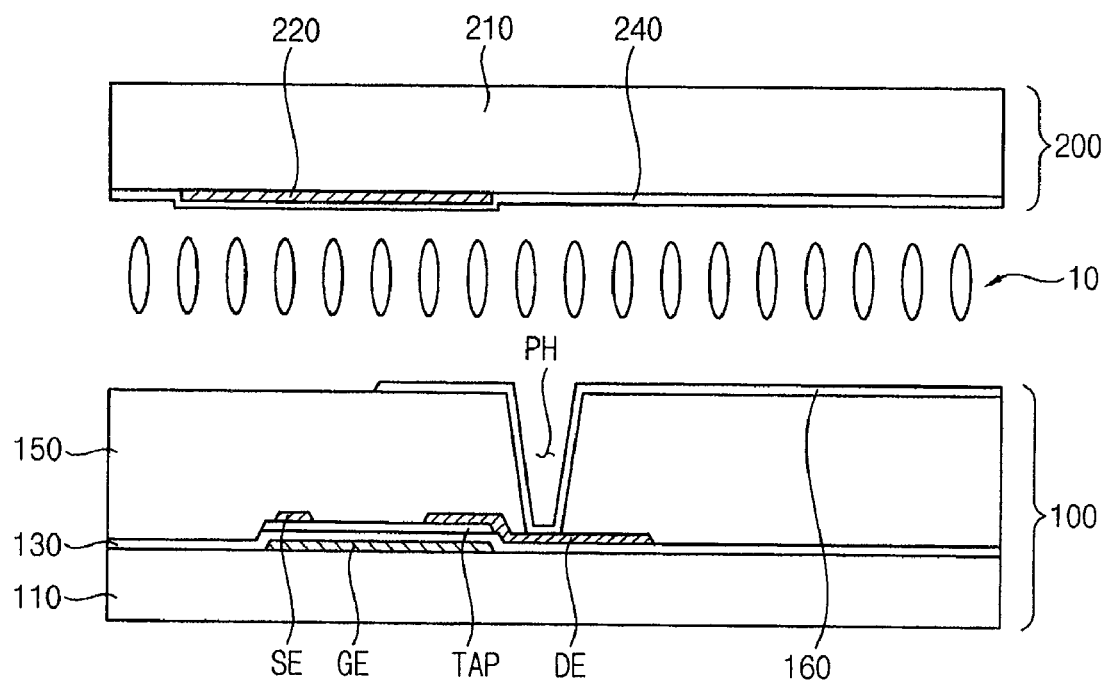
FIG. 5 is a cross-sectional view taken along a line III-III' of a transistor SW in FIG. 1 according to an embodiment.

FIG. 5 is a cross-sectional view taken along a line III-III' of transistor SW of FIG. 1. Referring to FIGS. 1 and 5, the display substrate 100 includes a first base substrate 110, a gate line GL, a storage line SL, a gate insulation layer 130, a data line DL, a TFT SW, a color filter 150 and a pixel electrode 160.

The TFT SW is formed at unit regions, and is electrically connected to the gate line GL and the data line DL. For example, the TFT includes a gate electrode GE, an active pattern TAP, a source electrode SE and a drain electrode DE. The gate electrode GE protrudes from the gate line GL in a crossing direction with respect to a first direction. The active pattern TAP is formed on the gate insulation layer 130 to overlap with the gate electrode GE. The source electrode SE protrudes from the data line DL toward the gate electrode GE, and overlaps with the active pattern TAP. The drain electrode DE spaced apart from the source electrode SE overlaps with the active pattern TAP, and is extended to overlap with a pixel electrode 160 described later.

The TFT SW is formed by a four mask process, the active pattern TAP may be formed at a lower portion of the data line DL. Namely, the active pattern TAP is formed on the gate insulation layer 130, and the data line DL may be formed on the active pattern TAP. The pixel electrode 160 is formed on the color filter 150, and is formed in each unit region. The pixel electrode 160 is electrically connected to the TFT SW, and is comprised of a transparent conductive material. For example, the pixel electrode 160 may be formed on the color filter 150 to overlap with the drain electrode DE of the TFT SW, and may be electrically connected to the drain electrode DE through a pixel contact hole PH formed at the color filter 150.

The counter substrate 200 includes a second base substrate 210, a light-blocking layer 220 and a common electrode 240. The second base substrate 210, facing the first base substrate 110, has a plate shape. The second base substrate 210 may be comprised, for example, of transparent glass, quartz and synthetic resins, similar to the first base substrate 110. The light-blocking layer 220 is formed at one side of the second base substrate 210, facing the first base substrate 110. For example, the light-blocking layer 220 may be formed to cover the gate line GL, the data line DL, the first sensor line 120, the second sensor line 140 and the storage line SL.

Figure 6:
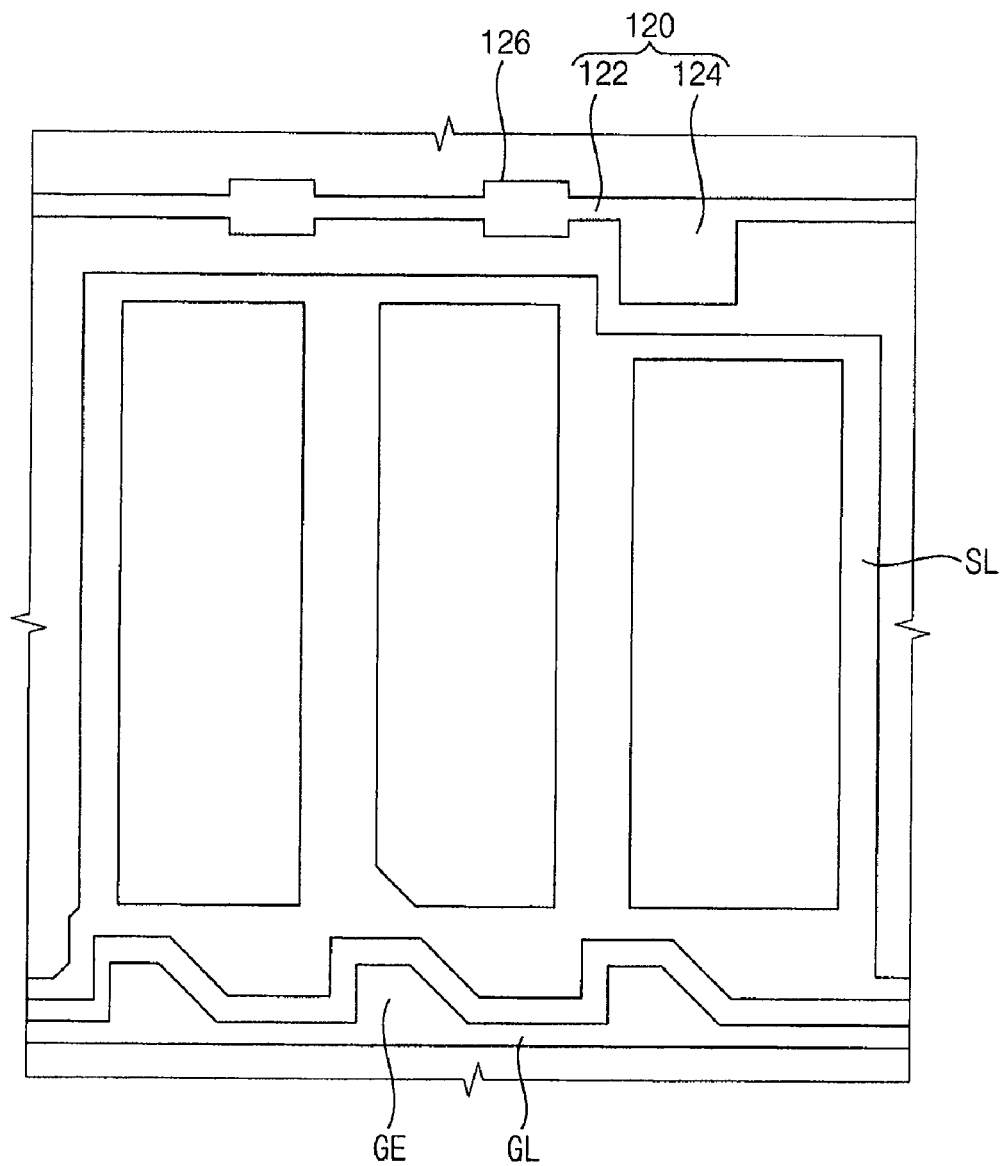
FIG. 6 is a plan view illustrating a gate line, a first sensor line and a storage line in FIG. 1 according to an embodiment.
Figure 7:
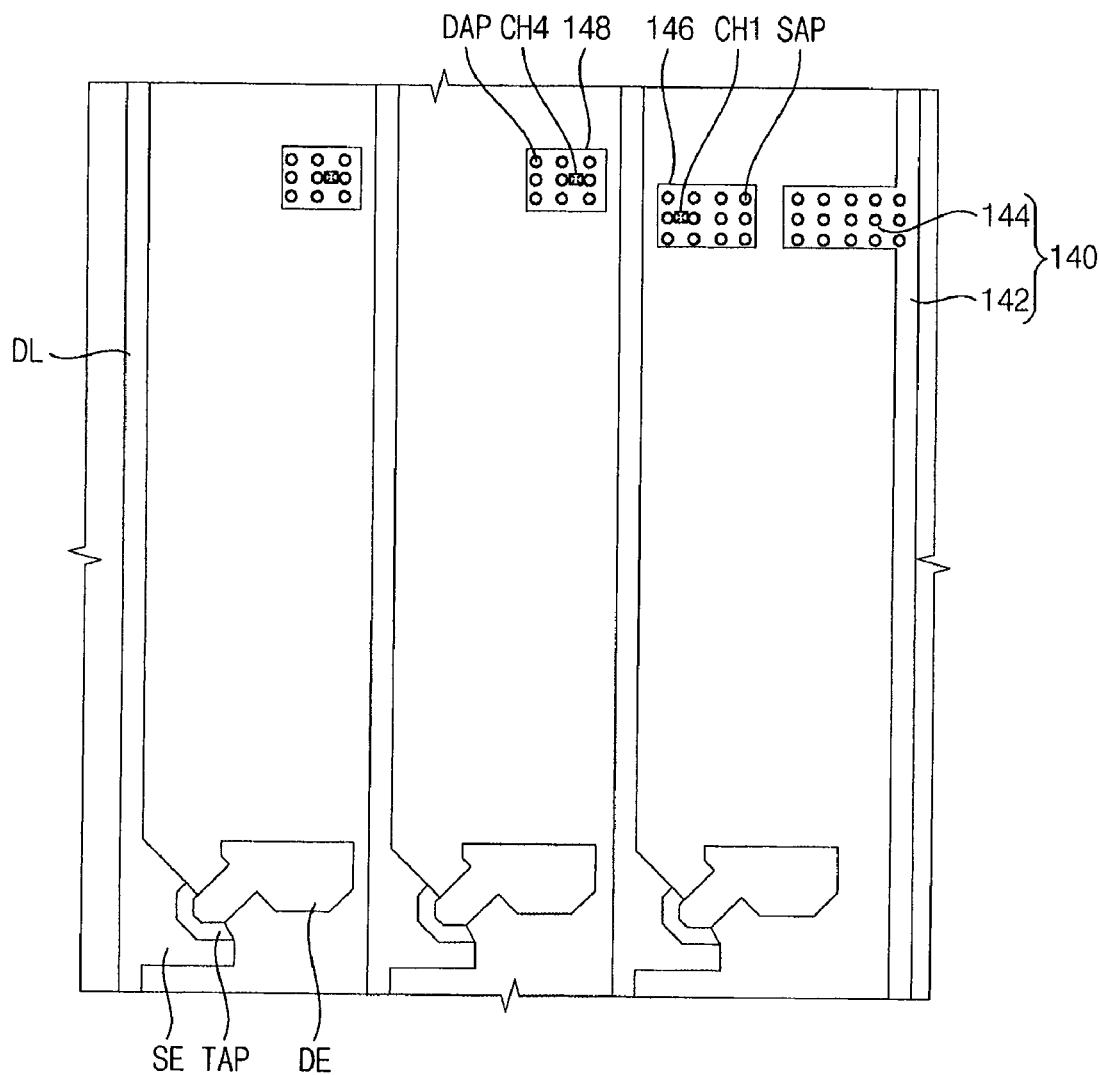
FIG. 7 is a plan view illustrating a data line, an active pattern, a drain electrode, a second sensor line, a sensor active pattern, a first sensor drain electrode, a second sensor drain electrode and a dummy drain electrode in FIG. 1 according to an embodiment.
Figure 8:
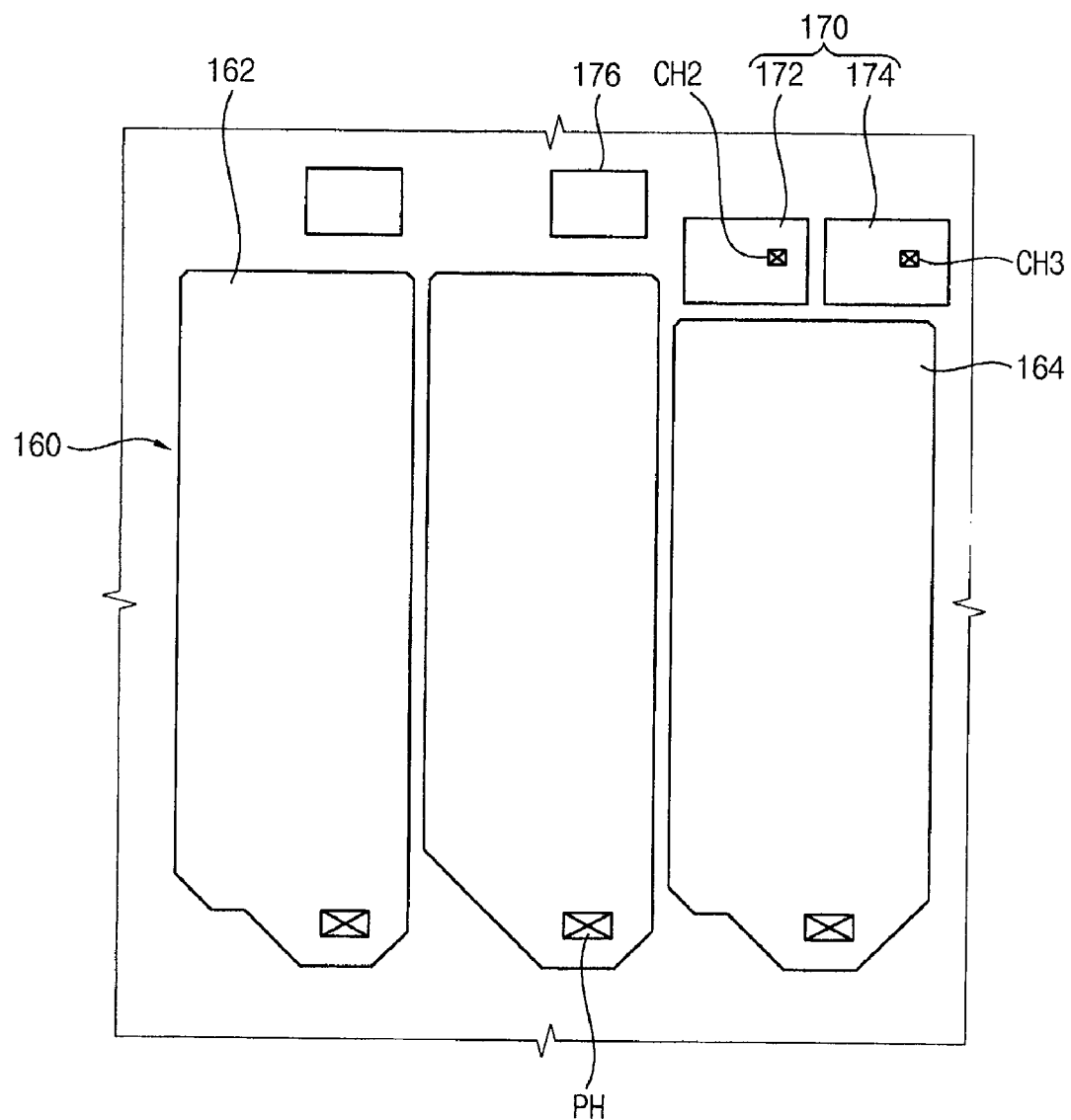
FIG. 8 is a plan view illustrating pixel electrodes and a sensor electrode part in FIG. 1 according to an embodiment.

FIGS. 6 to 8 are plan views illustrating a method of manufacturing display substrate 100 in FIG. 1. FIG. 6 is a plan view illustrating the gate line, the first sensor line and the storage line in FIG. 1; FIG. 7 is a plan view illustrating the data line, the active pattern, the drain electrode, the second sensor line, the sensor active pattern, the first sensor drain electrode, the second sensor drain electrode and the dummy drain electrode in FIG. 1; and FIG. 8 is a plan view illustrating the pixel electrodes and the sensor electrode part in FIG. 1.

Referring to FIG. 1, and FIG. 3 through 6, a gate line GL, a first sensor line 120 parallel to the gate line GL, and a storage line SL are formed on the first base substrate 110. For example, a gate electrode GE extended from the gate line GL, a first sensor main line 122 extended from the first sensor line 120 to the first direction, a first sensor gate electrode 124 protruding from the first sensor main line 122 in a crossing direction with respect to the first direction may be formed together with the gate line GL, the first sensor line 120 and the storage line SL.

Referring to FIG. 1, and FIG. 3 through 7, the data line DL, the active pattern TAP, the drain electrode DE, the second sensor line 140, the sensor active pattern SAP, the first sensor drain electrode 144, the second sensor drain electrode 146, and the dummy drain electrode 148 are formed on the first base substrate 110, where the gate line GL, the first sensor line 120, and the storage line SL are formed. The active pattern TAP, the sensor active pattern SAP, and the dummy active pattern DAP are formed on the first base substrate 110, where the gate line GL, the first sensor line 120 and the storage line SL are formed.

Subsequently, the data line DL, the second sensor line 140, the first sensor drain electrode 144, the second sensor drain electrode 146 and the dummy drain electrode 148 are formed. The second sensor line 140 is parallel with the data line DL. The second sensor line 140 includes a second sensor line 142 formed in the second direction, a first sensor drain electrode 144 protruding from the second sensor main line 142 in a direction crossing the second direction, a second sensor drain electrode 146 formed corresponding to the first sensor gate electrode 124, and a dummy drain electrode 148 formed corresponding to the dummy gate electrode 126. The first sensor drain electrode 144, extended from the second sensor line 140, is formed on the sensor active pattern SAP. The second sensor drain electrode 146 is formed on the sensor active pattern SAP corresponding to the first sensor gate electrode 124. The dummy drain electrode 148 is formed corresponding to the dummy active pattern DAP.

Referring to FIG. 1, and FIG. 3 through 8, the pixel electrode 160 and the sensor electrode part 170 are formed on the first base substrate 110, where the data line DL, the active pattern TAP, the drain electrode DE, the second sensor line 140, the sensor active pattern SAP, the first sensor drain electrode 144, the second sensor drain electrode 146, and the dummy drain electrode 148 are formed. For example, the pixel electrode 160 may be formed electrically connecting to the gate line GL and the data line DL, and the sensor electrode part 170 may be formed electrically connecting the first sensor drain electrode 144 with the second drain electrode 146, and spaced apart from the pixel electrode 160.

Figure 9:
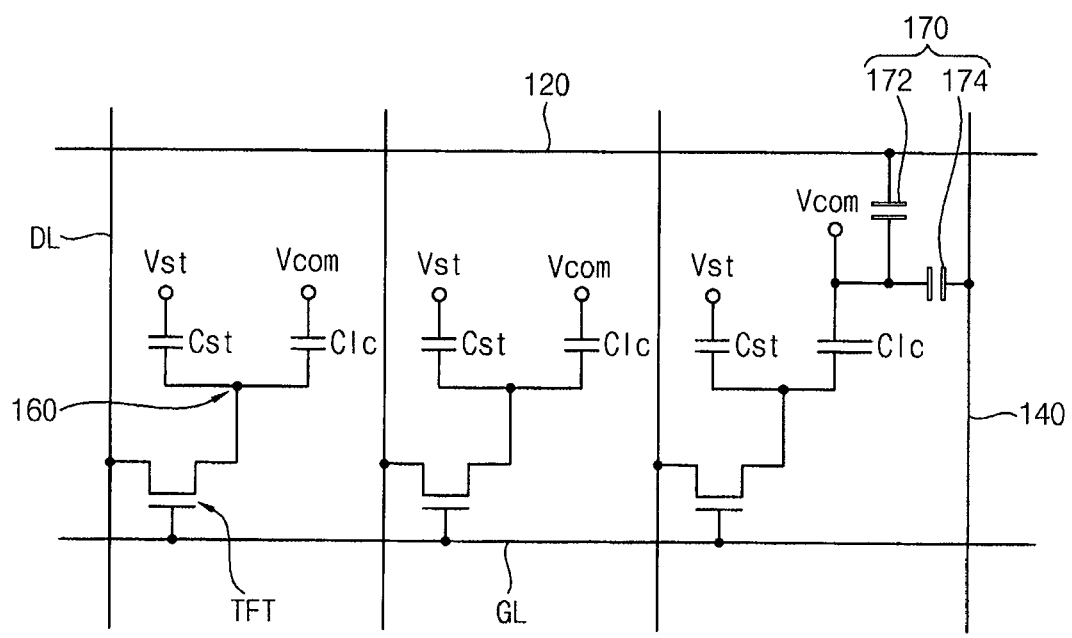
FIG. 9 is a circuit diagram illustrating electrical connections between elements in FIG. 1 according to an embodiment.

FIG. 9 is a circuit view illustrating a connection relationship of structural elements of FIG. 1. Referring to FIG. 1, FIG. 3 through FIG. 5, and FIG. 9, the gate line GL and the data line DL are formed in directions crossing each other. The gate electrode GE is electrically connected to the gate line GL, the source electrode SE is electrically connected to the data line DL, and the drain electrode DE is electrically connected to the pixel electrode 160. The pixel electrode 160 includes the first pixel electrode 162 which is not spaced apart from the sensor electrode part 170 and the second pixel electrode 164 which is spaced apart from the sensor electrode part 170.

The pixel electrode 160 forms a liquid crystal capacitor Clc at a space with the common electrode 240 of the counter substrate 200, and forms a storage capacitor Cst at a space with the storage line SL. A common voltage Vcom is applied to the common electrode 240, a storage voltage Vst is applied to the storage line SL.

The first sensor line 120 is formed to be parallel with the gate line GL, the second sensor line 140 is formed to be parallel with the data line DL. The first and second sensor lines 120, 140 are electrically connected to the sensor electrode part 170 which is spaced apart from the second pixel electrode 164. For example, the first sensor line 120 may be electrically connected to the first sensor main electrode 172, the second sensor line 140 may be electrically connected to the second sensor main electrode 174. The sensor electrode part 170 formed on the color filter 150 may have an embossed shape. Therefore, the common electrode 240 covering the sensor protrusion 230 may make effective contact with the sensor electrode part 170. If external pressure is applied to the display panel, the common electrode 240 electrically contacts the first and second sensor main electrode 172, 174, so the common voltage Vcom moves to the exterior sensor driver (not shown) through the first and second sensor lines 120, 140.

According to an embodiment, the sensor electrode part 170 is spaced apart from the pixel electrode 160 in a long axis direction of the unit region, thus, an aperture ratio of the display panel increases. Usually, the sensor electrode part is spaced apart from the pixel electrode in a short axis direction, so an aperture ratio decreases because an area of the pixel electrode is reduced. But, according to an embodiment in which the sensor electrode part 170 is spaced apart from the pixel electrode 160 in the long axis direction of the unit region, the aperture ratio may be enhanced by minimizing the reduction of area of the pixel electrode 160.

The first and second sensor drain electrodes 144, 146 have an embossed shape by the sensor active pattern SAP, the dummy active pattern DAP reflects light which is incident to the display panel from the exterior, and the dummy drain electrode 148 reflects light which is incident to the display panel from the exterior. The light-blocking layer 220 has holes removed corresponding to the first and second sensor drain electrodes 144, 146 and the dummy drain electrode 148, so the reflected light goes to the exterior from the display panel. Therefore, external visibility may be enhanced. Thus, a region of the first and second sensor lines 120, 140, where a color is not displayed among the unit regions, may be effectively used.

Example Two

Figure 10:
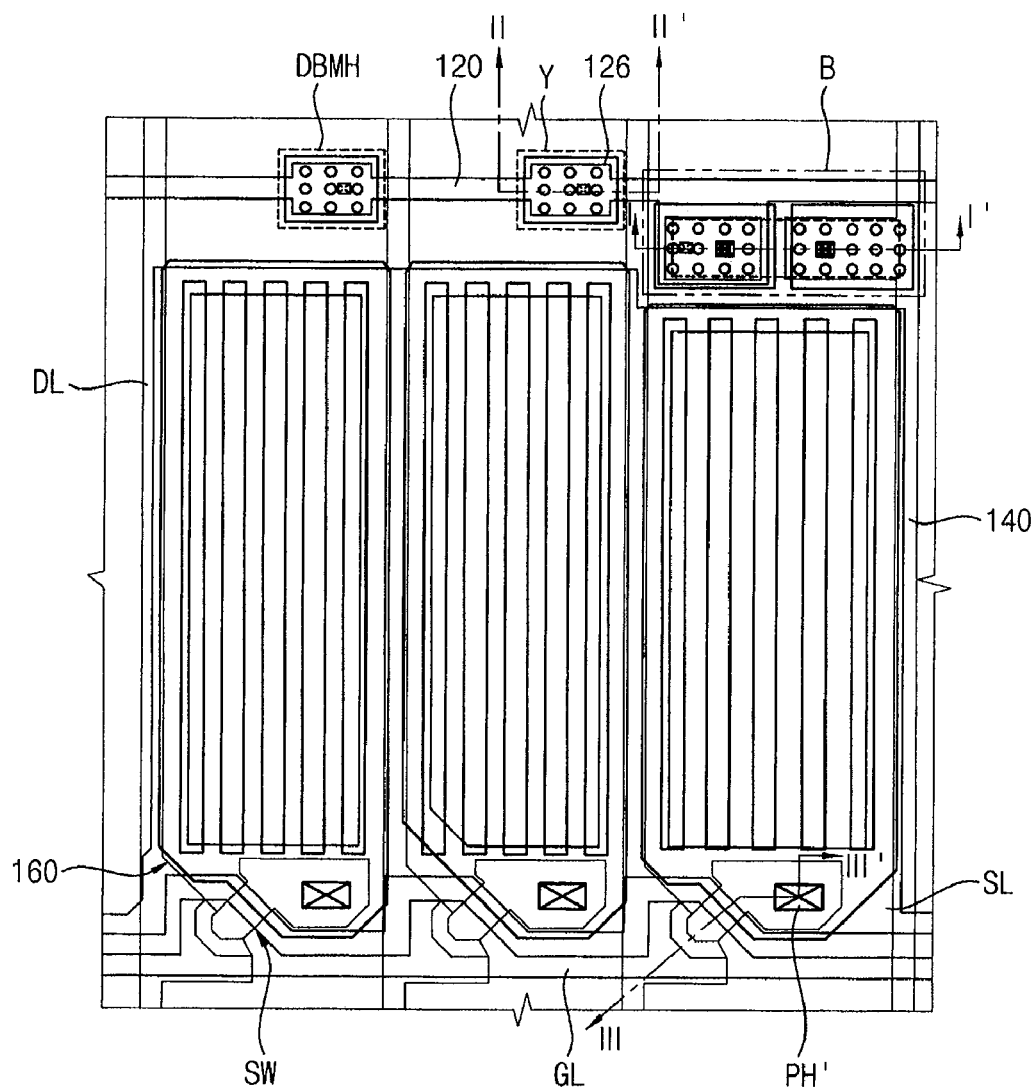
FIG. 10 is a plan view partially illustrating a display panel according to a second example embodiment.
Figure 12:
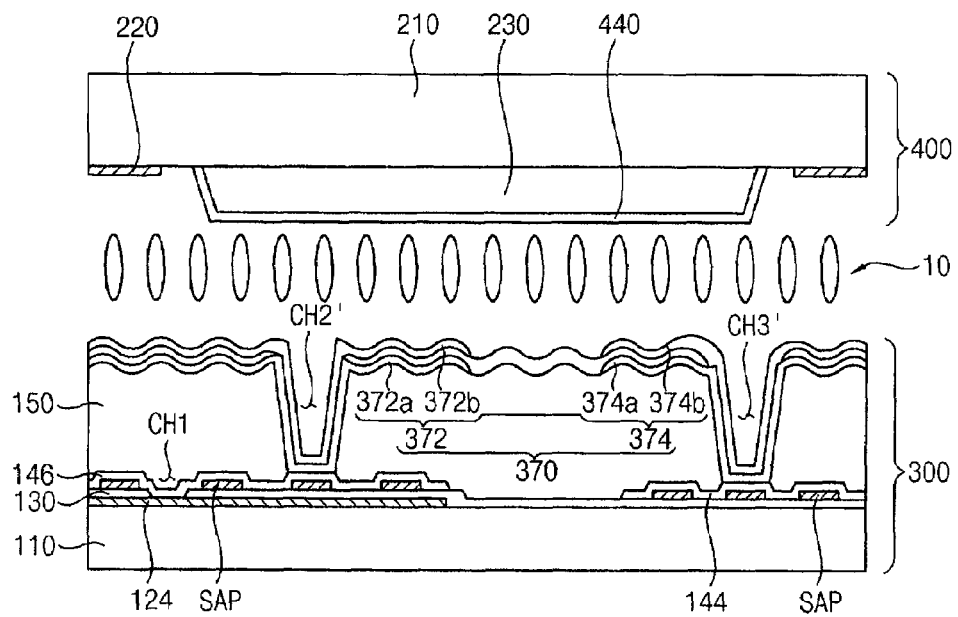
FIG. 12 is a cross-sectional view taken along a line I-I' of a sensor part B in FIG. 10 according to an embodiment.
Figure 13:
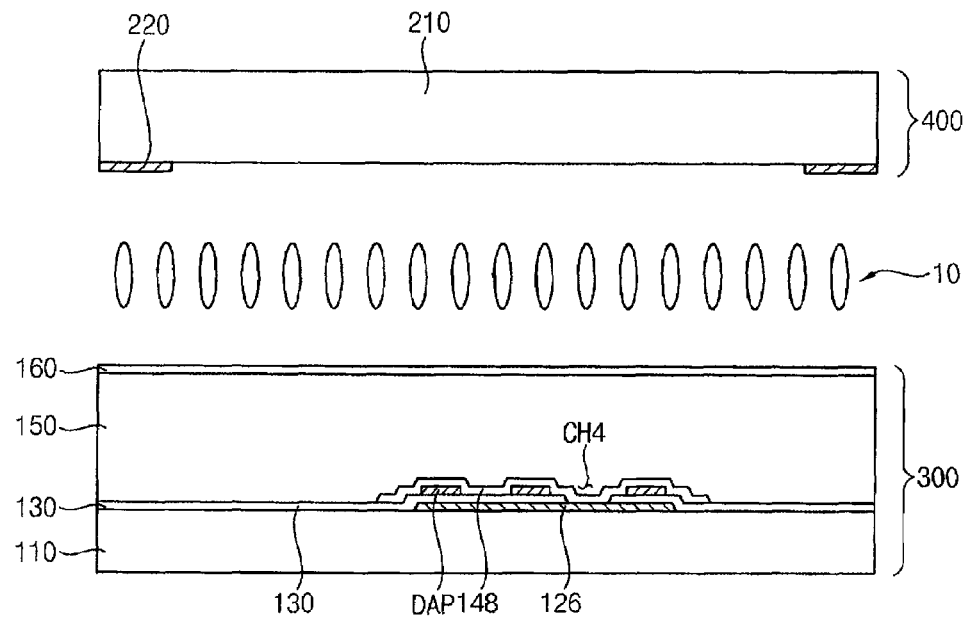
FIG. 13 is a cross-sectional view taken along a line II-II' of a dummy part Y in FIG. 10 according to an embodiment.
Figure 14:
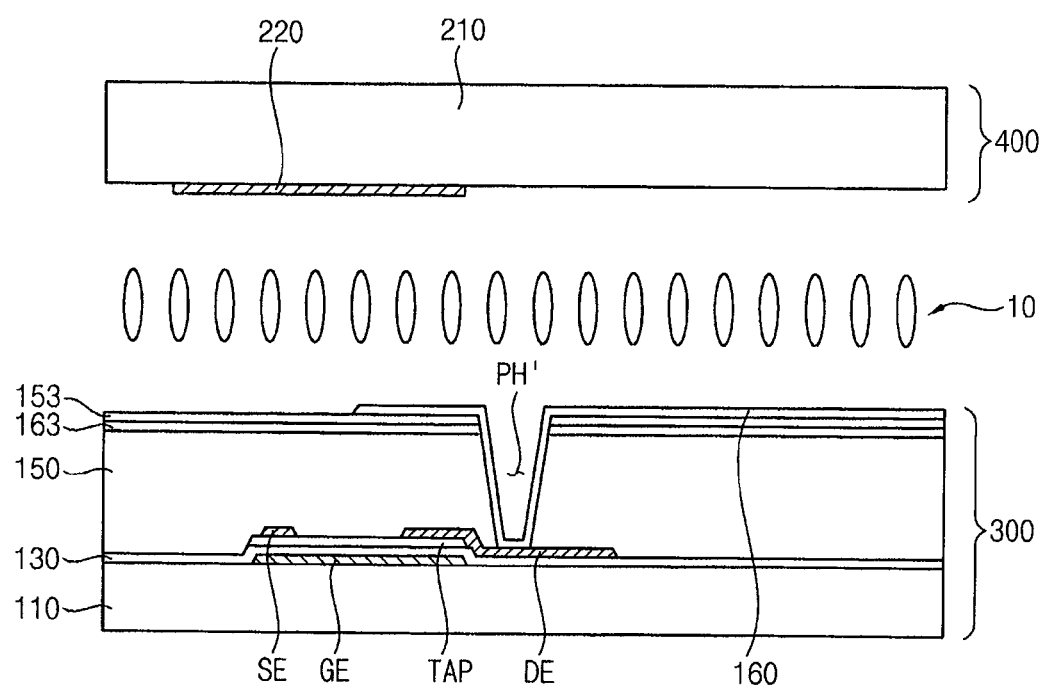
FIG. 14 is a cross-sectional view taken along a line III-III' of a transistor SW in FIG. 10 according to an embodiment.

FIG. 10 is a plan view illustrating a part of a display panel according to another embodiment; FIG. 11 is an enlarged plan view illustrating a sensor part B in FIG. 10; and FIG. 12 is a cross-sectional view taken along a line I-I' of a sensor part B in FIG. 10 in accordance with one or more embodiments. A display substrate 300 is substantially the same as the display panel described in FIG. 1 except that a common electrode 163 is formed on a display substrate 300. Thus, the same reference numerals are used for the same elements and repeated descriptions will be omitted. FIG. 13 is a cross-sectional view taken along a line II-II' of a dummy part Y in FIG. 10; and FIG. 14 is a cross-sectional view taken along a line III-III' of a transistor SW in FIG. 10 in accordance with one or more embodiments.

Referring to FIGS. 10 through 14, the display substrate 300 includes pixel electrodes 160 disposed as a matrix shape, TFTs SW electrically connected to the pixel electrodes 160, gate lines electrically connected to the TFT SW, and data lines DL electrically connected to the TFT SW. The plurality of gate lines GL and data lines DL are formed in directions that cross each other, and a plurality of unit regions are defined on the display substrate 300. A part of the unit regions have a sensor part B for sensing a position of pressure from the exterior. A part of the unit regions have a dummy part Y for reflecting light.

The display substrate 300 further includes a common electrode 163 to which a common voltage is applied. A fringe field E occurs in a parallel direction and a perpendicular direction (observer's view) with respect to the display substrate 300, and the alignment of liquid crystal molecules may be controlled. Such a display panel control method is referred to as a fringe field switching (FFS) method. Therefore, the display device having the display panel may have a wide viewing angle.

A counter substrate 400 facing the display substrate 300 includes a light-blocking layer 220. The liquid crystal layer 10 is disposed between the display substrate 300 and the counter substrate 400, and is rearranged by an electric field formed between the display substrate 300 and the counter substrate 400. Therefore, if light is applied from the exterior, the transmittance of the light is controlled by the rearranged liquid crystal layer 10, and an image may be displayed to the exterior.

The display substrate 300 includes a first base substrate 110, a gate line GL, a storage line SL, a first sensor line 120, a gate insulation layer 130, a data line DL, a TFT SW, a second sensor line 140, a color filter 150, a pixel electrode 160, and a sensor electrode part 170. The color filter 150 corresponding to the sensor part B has an embossed shape.

The common electrode 163 may comprise deposits of a transparent conductive material such as ITO or IZO on the color filter 150, and may be formed by a photo-etching process using a mask. The common electrode 163 is formed at the unit regions in a full-scale on the first base substrate 110, where the data line DL is formed. The common electrode 163 is electrically connected to a common signal line (not shown). The common signal line is electrically connected to a terminal supplying a common voltage. An electrode insulation layer 153 is formed at the common electrode 163.

The pixel electrode 160 is electrically connected to the TFT SW, and is comprised of a transparent conductive material. The pixel electrode 160 is formed on the common electrode 163 and the electrode insulation layer 153 to overlap with the drain electrode DE of the TFT SW. A pixel contact hole PH exposing a part of the drain electrode DE is formed at the color filter 150. A bigger hole is formed at the common electrode 163 than the pixel contact hole PH in pixel electrode 160, so the pixel electrode 160 and the common electrode 163 are insulated from each other.

A plurality of slits is formed at the pixel electrode 160. The slits may be extended parallel to a first direction, which is the direction of the data line DL. An electric field known as a fringe field E is formed between the pixel electrode 160 and the common electrode 163 by the slits. A voltage having a different polarity is respectively applied to the pixel electrode 160 and the common electrode 163, and an electric flux is formed from the pixel electrode 160 to the common electrode 163 through the slits. The electric flux has a horizontal element parallel with the display substrate 300 and a vertical element perpendicular to the display substrate 300.

A sensor electrode part 370 spaced apart from the pixel electrode 160 is formed on an upper portion of the color filter 150. For example, the sensor electrode part 370 formed at a part of the unit regions may be electrically connected to the first sensor line 120 and the second sensor line 140. For example, the sensor electrode part 370 may be spaced apart from the pixel electrode 160 in a second direction which is a long axis of a unit region. The sensor electrode part 370 may be formed at a position where the first sensor line 120 and the second sensor line 140 cross each other.

The sensor electrode part 370 includes a first sensor main electrode 372 electrically connected to the first sensor line 120 and a second sensor main electrode 374 electrically connected to the second sensor line 140. The first sensor main electrode 372 includes a first common main electrode 372a and a first pixel main electrode 372b, the second sensor main electrode 374 includes a second common main electrode 374a and a second pixel main electrode 374b. The first common main electrode 372a and the second common main electrode 374a are formed at the same layer as the common electrode 163. The second pixel main electrode 372b and the second pixel main electrode 374b are formed at the same layer as the pixel electrode 160.

The first sensor main electrode 372 is formed on the color filter 150 to overlap with the first sensor gate electrode 124. The first sensor main electrode 372 is electrically connected to the second sensor drain electrode 146 through a second contact hole CH2 formed on the color filter 150.

The second sensor main electrode 374 is formed on the color filter 150 to overlap with the first sensor drain electrode 144. The second sensor main electrode 374 is electrically connected to the first sensor drain electrode 144 through a third contact hole CH3 formed on the color filter 150. The first common main electrode 372a and the second pixel main electrode 372b are electrically connected to the second sensor drain electrode 146. The second common main electrode 374a and the second pixel main electrode 374b are electrically connected to the first sensor drain electrode 144. The first sensor main electrode 372 and the second sensor main electrode 374 have an extended shape along an imaginary reference line parallel with the first direction.

The counter substrate 400 includes a second base substrate 210, and a light-blocking layer 220. The second base substrate 210, facing the first base substrate 110, has a plate shape. The second base substrate 210 may be comprised of transparent glass, quartz and synthetic resins, similar to the first base substrate 110. The light-blocking layer 220 is formed at one side of the second base substrate 210, facing the first base substrate 110. For example, the light-blocking layer 220 may be formed to cover the gate line GL, the data line DL, the first sensor line 120, the second sensor line 140 and the storage line SL.

The counter substrate 400 includes a sensor protrusion 230 protruding toward the sensor electrode part 370. The sensor protrusion 230 has an extended shape in a first direction which is a longitudinal direction of the sensor electrode part 370. The sensor protrusion 230 is covered by a sensor protrusion electrode 440. The sensor protrusion electrode 440 electrically contacts the first and second sensor main electrode 372, 374, so a voltage of the sensor protrusion electrode 440 moves to the exterior sensor driver (not shown) through the first and second sensor lines 120, 140.

The unit region where the sensor electrode part 370 is not formed is defined as a first unit region, the unit region where the sensor electrode 370 is formed is defined as a second unit region. The pixel electrodes 160 include a first pixel electrode 162 formed at the first unit region and a second pixel electrode 164 formed at the second unit region.

A method of manufacturing the display substrate 300 is substantially the same as the method of manufacturing the display substrate 100 described in FIG. 1 except that a sensor electrode part 370 includes a common electrode 163. Thus, the same reference numerals are used for the same elements and repeated descriptions will be omitted.

Figure 15:
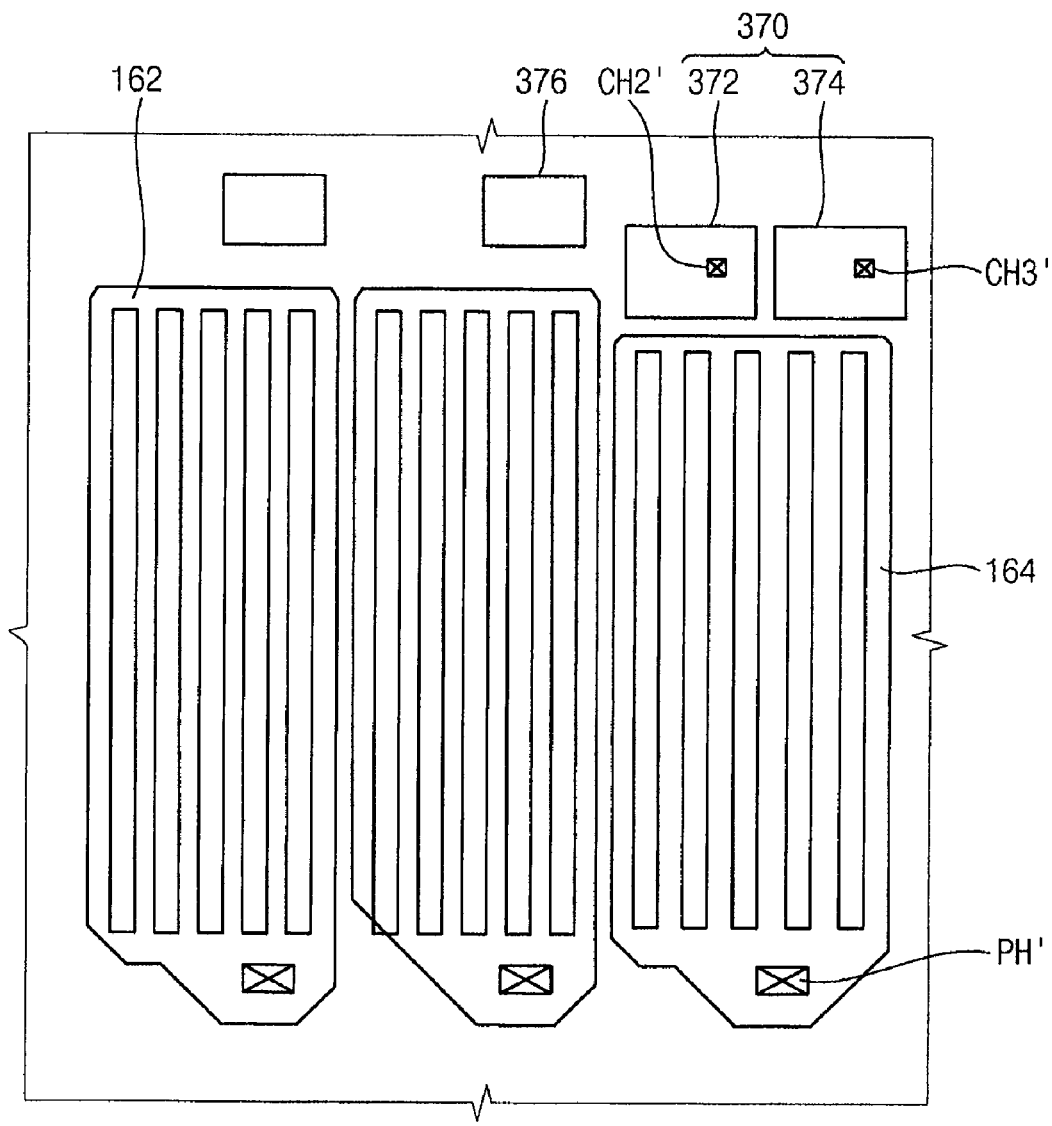
FIG. 15 is a plan view illustrating pixel electrodes and a sensor electrode in FIG. 10 according to an embodiment.

FIG. 15 is a plan view illustrating pixel electrodes and a sensor electrode in FIG. 10. Referring to FIGS. 10 through 12 and FIG. 15, the pixel electrode 160 and the sensor electrode part 370 are formed on the first base substrate 110 where the data line DL, the active pattern TAP, the drain electrode DE, the second sensor line 140, the sensor active pattern SAP, the first sensor drain electrode 144, the second sensor drain electrode 146 and the dummy drain electrode 148 are formed. For example, the pixel electrode 160 may be formed electrically connecting the gate line GL and the data line DL, and the sensor electrode part 370 may be formed electrically connecting the first sensor drain electrode 144 and the second sensor drain electrode 146, and spaced apart from the pixel electrode 160.

Figure 16:
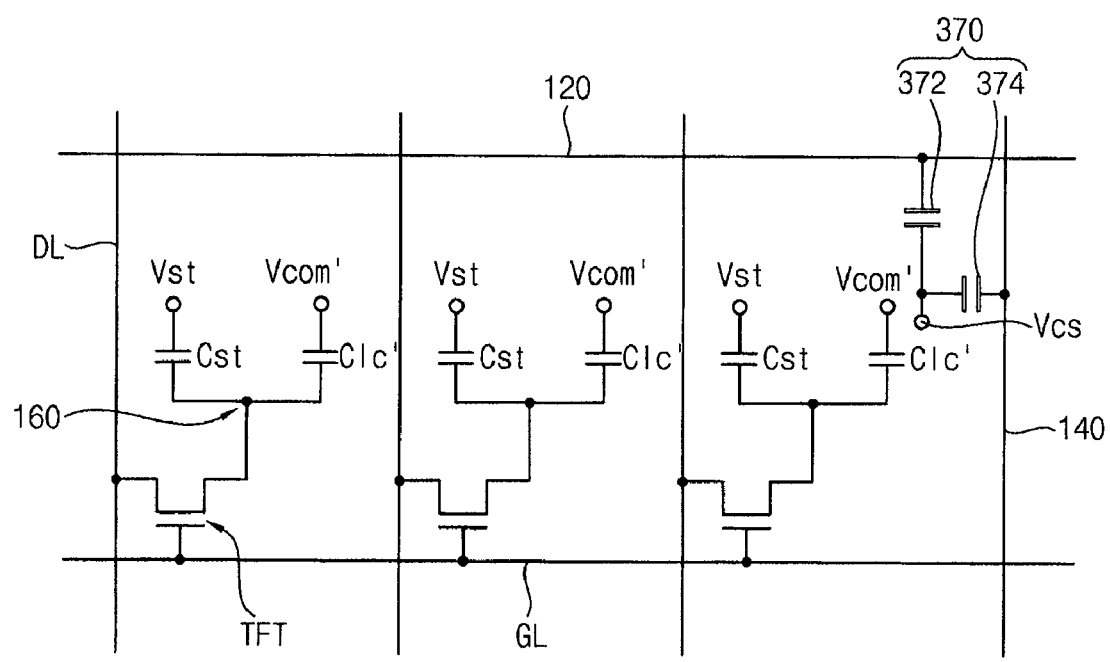
FIG. 16 is a circuit view illustrating a connection relationship of structural elements of FIG. 10 according to an embodiment.

FIG. 16 is a circuit view illustrating a connection relationship of structural elements of FIG. 10. Referring to FIGS. 10, 12 through 14, and FIG. 16, the gate line GL and the data line DL are formed in directions crossing each other. The gate electrode GE is electrically connected to the gate line GL, the source electrode SE is electrically connected to the data line DL, and the drain electrode DE is electrically connected to the pixel electrode 160. The pixel electrode 160 includes the first pixel electrode 162, which is not spaced apart from the sensor electrode part 370, and the second pixel electrode 164, which is spaced apart from the sensor electrode part 370.

A liquid crystal capacitor Clc is formed between the pixel electrode 160 of the display substrate 300 and the common electrode 163, and a storage capacitor Cst is formed at a space with the storage line SL. A common voltage Vcom is applied to the common electrode 163, and a storage voltage Vst is applied to the storage line SL.

The first sensor line 120 is formed to be parallel with the gate line GL, the second sensor line 140 is formed to be parallel with the data line DL. The first and second sensor lines 120, 140 are electrically connected to the sensor electrode part 370 which is spaced apart from the second pixel electrode 164. For example, the first sensor line 120 may be electrically connected to the first sensor main electrode 372, and the second sensor line 140 may be electrically connected to the second sensor main electrode 374.

The sensor electrode part 370 formed on the color filter 150 may have an embossed shape. Therefore, the sensor protrusion electrode 440 covering the sensor protrusion 230 may make effective contact with the sensor electrode part 370. If external pressure is applied to the display panel, the sensor protrusion electrode 440 electrically contacts the first and second sensor main electrode 370 (372, 374), so a protrusion voltage Vcs of the sensor protrusion electrode 440 moves to the exterior sensor driver (not shown) through the first and second sensor lines 120, 140. According to an embodiment, the sensor electrode part 370 is spaced apart from the pixel electrode 160 in a long axis direction of the unit region, and an aperture ratio of the display panel increases. The pixel electrode 160 and the common electrode 163 are formed on the display substrate 300. A fringe field E occurs in a parallel direction and a perpendicular direction (observer's view) with respect to the display substrate 300, the alignment of liquid crystal molecules may be controlled, and the display device having the display panel may have a wide viewing angle.

Example Three

Figure 17:
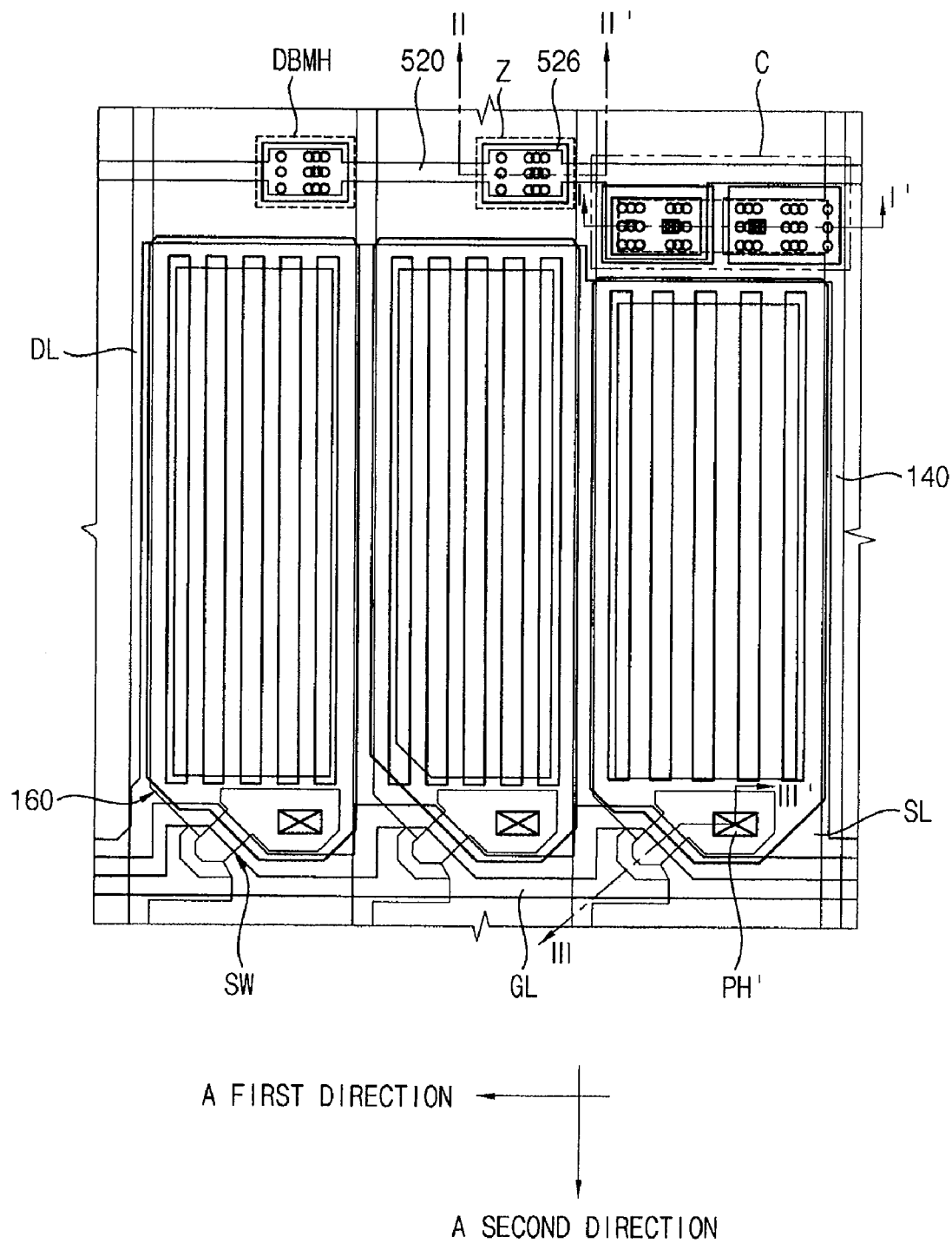
FIG. 17 is a plan view illustrating a part of a display panel according to a third example embodiment.
Figure 19:
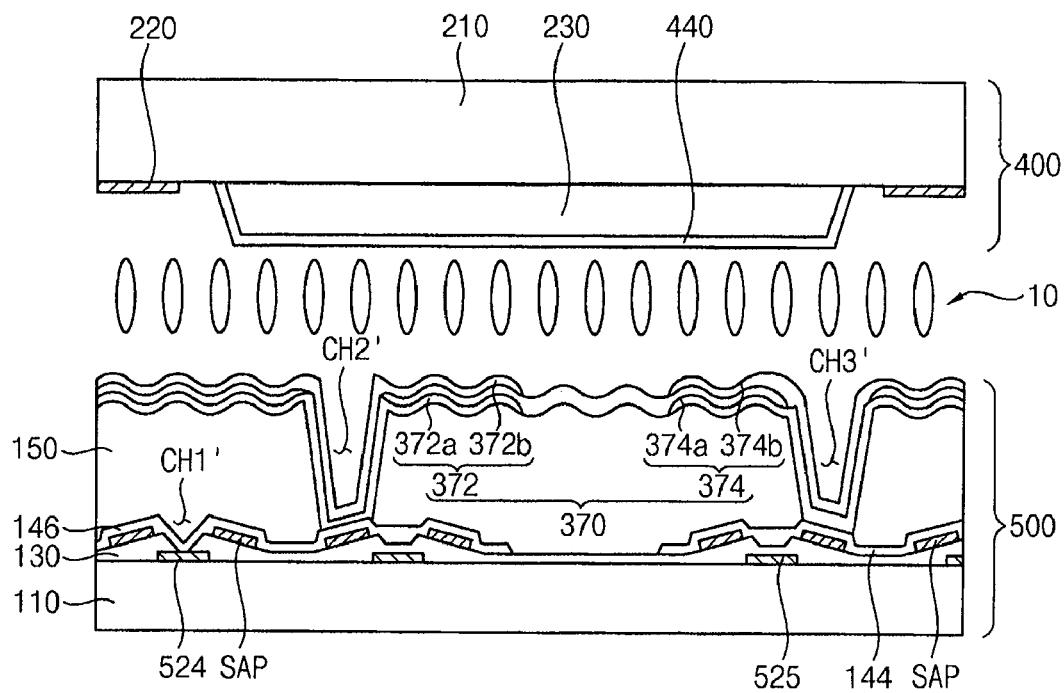
FIG. 19 is a cross-sectional view taken along a line I-I' of a sensor part C in FIG. 17 according to an embodiment.
Figure 20:
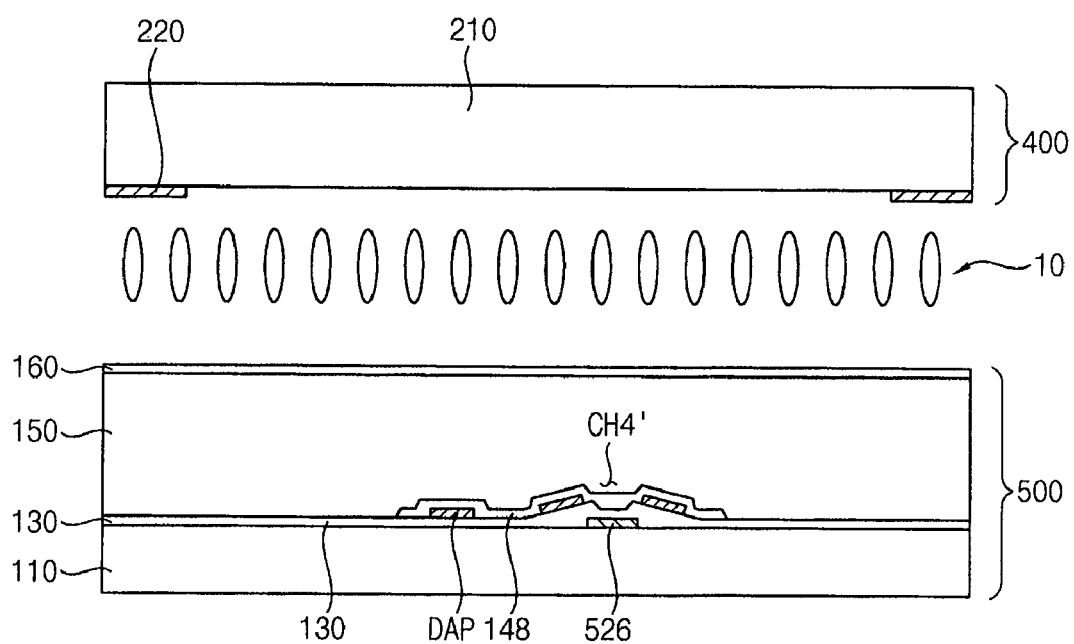
FIG. 20 is a cross-sectional view taken along a line II-II' of a dummy part Z in FIG. 17 according to an embodiment.

FIG. 17 is a plan view illustrating a part of a display panel according to another embodiment; FIG. 18 is an enlarged plan view illustrating a sensor part C in FIG. 17; FIG. 19 is a cross-sectional view taken along a line I-I' of a sensor part C in FIG. 17; and FIG. 20 is a cross-sectional view taken along a line II-II' of a dummy part Z in FIG. 17 in accordance with one or more embodiments. A display substrate 500 is substantially the same as the display panel described in FIG. 10 except that a common electrode 163 is formed on a display substrate 500, and a first sensor gate electrode 524, a second gate electrode 525 and a dummy gate electrode 526 have a plurality of island-type sub-gate members. Thus, the same reference numerals are used for the same elements and repeated descriptions will be omitted.

Referring to FIGS. 17 to 20, the display substrate 500 includes a first base substrate 110, a gate line GL, a storage line SL, a first sensor line 520, a gate insulation layer 130, a data line DL, a TFT SW, a second sensor line 140, a color filter 150, a pixel electrode 160 and a sensor electrode part 370. The first sensor line 520, spaced apart from the gate line GL and the storage line SL, is formed parallel to the gate line GL. A plurality of first sensor lines is formed in the first direction. The first sensor line 520 is spaced apart from the gate line GL, and one may be formed for every certain number of the gate lines GL. For example, the first sensor line 520 may be formed once for every six gate lines GL. The first sensor line 520 includes a first sensor main line 522 formed in a first direction and a first sensor gate electrode 524 protruding from the first sensor main line 522 in a direction crossing the first direction. The first sensor gate electrode 524 may protrude from the first sensor main electrode 522 in a direction perpendicular to the first direction. The first sensor gate electrode 524 may have a plurality of island-type sub-gate members.

The first sensor line 520 may further include a dummy gate electrode 526 protruding from the first sensor main line 522 in a direction perpendicular to the first direction. The dummy gate electrode 526 may have a plurality of island-type sub-gate members. The dummy gate electrode 526 may include a dummy part which is formed at the unit region where the sensor electrode part 370 is not formed.

The gate insulation layer 130 is formed on the first base substrate 110 to cover the gate line GL, the storage line SL and the first sensor line 520. The gate insulation layer 130 is an inorganic insulation layer that, for example, may include a silicon nitride (SiNx) or silicon oxide (SiOx).

A second sensor gate electrode 525 also may be included corresponding to the first sensor drain electrode 144. The second gate electrode 525 has a plurality of island-type sub-gate members. The first sensor drain electrode 144 may have an embossed shape by the sensor active pattern SAP having a plurality of island-type sub-active members. The plurality of island-type sub-active members is formed corresponding to the second gate electrode 525 and the first sensor drain electrode 144.

A second sensor drain electrode 146 spaced apart from the first sensor drain electrode 144 is formed corresponding to the first sensor gate electrode 524. The second sensor drain electrode 146 is electrically connected to the first sensor gate electrode 524 through a first contact hole CH1 formed at the gate insulation layer 130. The sensor active pattern SAP is formed on the gate insulation layer 130 corresponding to the first sensor gate electrode 524. The second sensor drain electrode 146 may have an embossed shape by the sensor active pattern SAP.

The dummy drain electrode 148 is electrically connected to the dummy gate electrode 526 through a fourth contact hole CH4 formed at the gate insulation layer 130. A dummy active pattern DAP having a plurality of island type sub-active members is formed on the gate insulation layer 130 corresponding to the dummy gate electrode 526. The dummy drain electrode 148 may have an embossed shape by the dummy gate electrode 526 and the dummy active pattern DAP.

A sensor electrode part 370 spaced apart from the pixel electrode 160 is formed on an upper portion of the color filter 150. For example, the sensor electrode part 370 formed at a part of the unit region may be electrically connected to the first sensor line 520 and the second sensor line 140. For example, the sensor electrode part 370 may be spaced apart from the pixel electrode 160 in a second direction which is a long axis of a unit region. The sensor electrode part 370 may be formed at a position where the first sensor line 520 and the second sensor line 140 cross each other. The sensor electrode part 370 includes a first sensor main electrode 372 electrically connected to the first sensor line 520 and a second sensor main electrode 374 electrically connected to the second sensor line 140.

The first sensor line 520 is formed on the first base substrate 110, and includes a first sensor main line 522 and a first sensor gate electrode 524. The first sensor main line 522 is extended in a first direction and is spaced apart from the gate line GL. The first sensor gate electrode 524 protrudes from the first sensor main line 522 in a direction crossing the first direction. The first sensor gate electrode 524 may protrude parallel to the data line DL, and may protrude in a direction perpendicular to the first direction.

The second sensor line 140 is formed on the gate insulation layer 130, and includes the second sensor main line 142 and the first sensor drain electrode 144. The second sensor main line 142 is extended in the second direction, and is spaced apart from the data line DL. The first sensor drain electrode 144 protrudes from the second sensor main line 142 toward the first sensor gate electrode 524 in a direction crossing the second direction. The first sensor drain electrode 144 may protrude in a direction parallel to the gate line GL, and may protrude in a direction perpendicular to the second direction.

The sensor electrode part 370 is formed on the color filter 150, and is comprised of a transparent conductive material similar to that of the pixel electrode 160. The sensor electrode part 370 includes a first sensor main electrode 372 electrically connected to the first sensor line 520 and a second sensor main electrode 374 electrically connected to the second sensor line 140. The first sensor main electrode 372 is formed on the color filter 150 to overlap with the first sensor gate electrode 524. The first sensor main electrode 372 is electrically connected to the second sensor drain electrode 146 through a second contact hole CH2 formed on the color filter 150. The second sensor drain electrode 146 is electrically connected to the first sensor gate electrode 524 through a first contact hole CH1 formed at the gate insulation layer 130. The first sensor main electrode 372 may have a rectangular shape and an area covering the first sensor gate electrode 524. The second sensor main electrode 374 is formed on the color filter 150 having an embossed shape to overlap with the first sensor drain electrode 144, and is electrically connected to the first sensor drain electrode 144 through a third contact hole CH3 formed on the color filter 150. The second sensor main electrode 374 may have a rectangular shape. The first sensor main electrode 372 and the second sensor main electrode 374 have an extended shape along an imaginary reference line parallel to the first direction.

Referring to FIGS. 17, 19, and 20, a counter substrate 400 according to an embodiment is illustrated. The counter substrate 400 includes a second base substrate 210, and a light-blocking layer 220. The second base substrate 210, facing the first base substrate 110, has a plate shape. The second base substrate 210 may be comprised of transparent glass, quartz and synthetic resins similar to the first base substrate 110. The light-blocking layer 220 is formed at one side of the second base substrate 210, facing the first base substrate 110. For example, the light-blocking layer 220 may be formed to cover the gate line GL, the data line DL, the first sensor line 120, the second sensor line 140 and the storage line SL.

The counter substrate 400 includes a sensor protrusion 230 protruding toward the sensor electrode part 370. The sensor protrusion 230 has an extended shape in a first direction which is a longitudinal direction of the sensor electrode part 370. The sensor protrusion 230 is covered by a sensor protrusion electrode 440. The sensor protrusion electrode 440 electrically contacts the first and second sensor main electrodes 372, 374, so a protrusion voltage Vcs of the sensor protrusion electrode 440 moves to the exterior sensor driver (not shown) through the first and second sensor lines 520, 140.

The unit region where the sensor electrode part 370 is not formed is defined as a first unit region, the unit region where the sensor electrode 370 is formed is defined as a second unit region. The pixel electrodes 160 include a first pixel electrode 162 formed at the first unit region and a second pixel electrode 164 formed at the second unit region.

Figure 21:
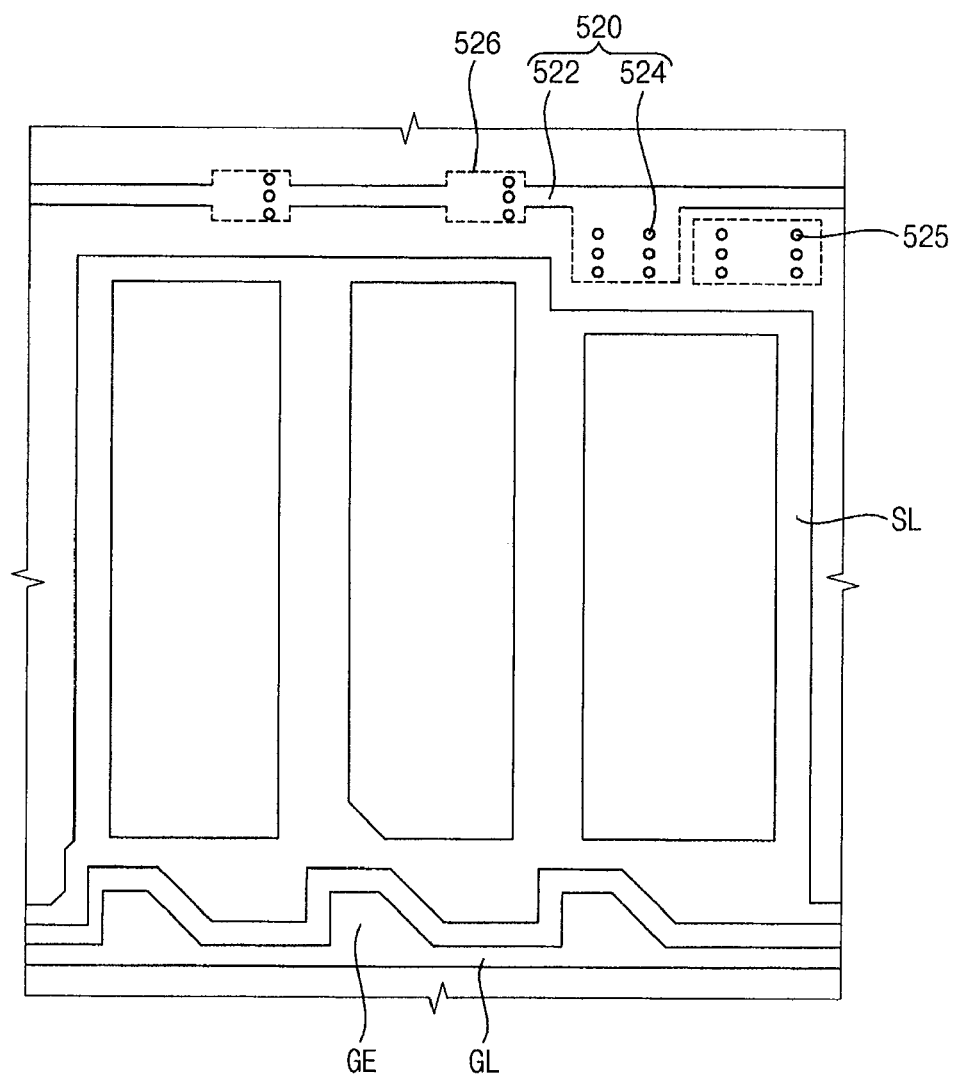
FIG. 21 is a plan view illustrating the gate line, the first sensor line and the storage line in FIG. 17 according to an embodiment.

A method of manufacturing the display substrate 500 is substantially the same as the method of manufacturing the display substrate 300 according to an embodiment except that a first sensor gate electrode 524, a second gate electrode 525 and a dummy gate electrode 526 have a plurality of island-type sub-gate members. Thus, the same reference numerals are used for the same elements and repeated descriptions will be omitted. FIG. 21 is a plan view illustrating the gate line, the first sensor line and the storage line in FIG. 17.

Referring to FIGS. 17, 19, and 21, a gate line GL, a first sensor line 120 parallel to the gate line GL, and a storage line SL are formed on the first base substrate 110. For example, a gate electrode GE extended from the gate line GL, a first sensor main line 522 extended from the first sensor line 520 in the first direction, and a first sensor gate electrode 524 protruding from the first sensor main line 522 in a direction crossing the first direction may be formed together with the gate line GL, the first sensor line 520, and the storage line SL.

Figure 22:
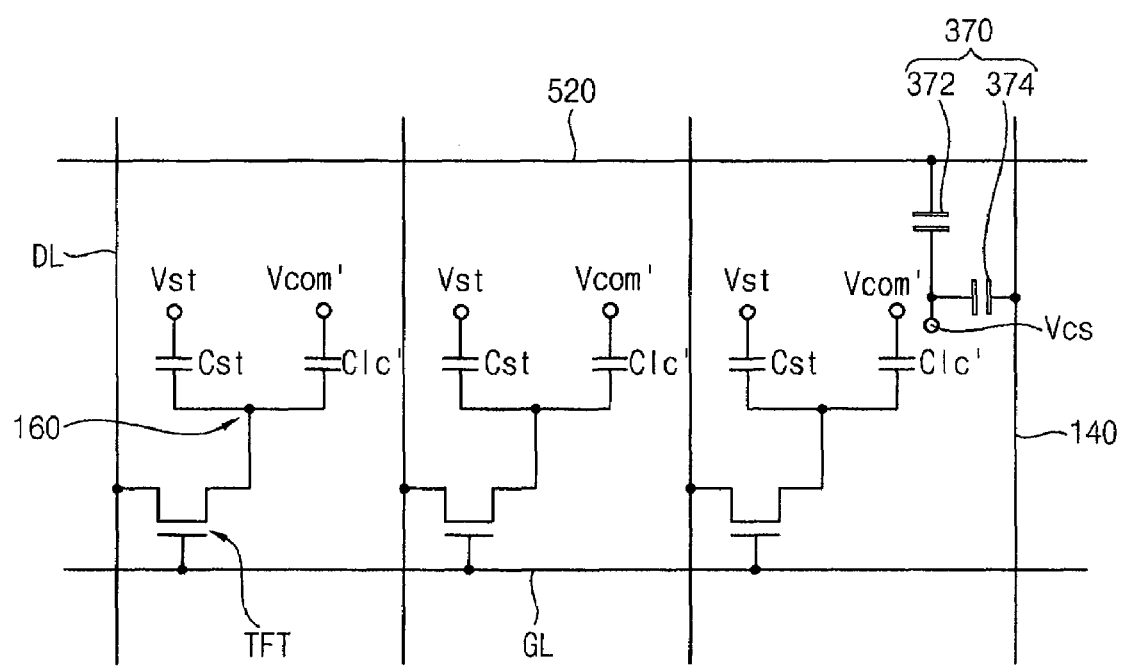
FIG. 22 is a circuit view illustrating a connection relationship of structural elements of FIG. 17 according to an embodiment.

FIG. 22 is a circuit view illustrating a connection relationship of structural elements of FIG. 17. Referring to FIGS. 15, 17, 19, 20, 21 and 22, the gate line GL and the data line DL are formed at crossing directions to each other. The gate electrode GE is electrically connected to the gate line GL, the source electrode SE is electrically connected to the data line DL, and the drain electrode DE is electrically connected to the pixel electrode 160. The pixel electrodes 160 include the first pixel electrode 162, which is not spaced apart from the sensor electrode part 370, and the second pixel electrode 164, which is spaced apart from the sensor electrode part 370.

A liquid crystal capacitor Clc is formed between the pixel electrode 160 of the display substrate 500 and the common electrode 163, and a storage capacitor Cst is formed at a space with the storage line SL. A common voltage Vcom is applied to the common electrode 163, and a storage voltage Vst is applied to the storage line SL.

The first sensor line 520 is formed to be parallel with the gate line GL, the second sensor line 140 is formed to be parallel with the data line DL. The first and second sensor lines 520, 140 are electrically connected to the sensor electrode part 370, which is spaced apart from the second pixel electrode 164. For example, the first sensor line 520 may be electrically connected to the first sensor main electrode 372, and the second sensor line 140 may be electrically connected to the second sensor main electrode 374. If external pressure is applied to the display panel, the common electrode 163 may electrically contact the first and second sensor main electrodes 372, 374, so that the common voltage Vcom moves to the exterior sensor driver (not shown) through the first and second sensor lines 520, 140.

The first and second sensor drain electrodes 144, 146 having the embossed shape by the sensor active pattern SAP and the dummy active pattern DAP reflect light which is incident to the display panel from the exterior, and the dummy drain electrode 148 reflects light which is incident to the display panel from the exterior. The light-blocking layer 220 has holes removed corresponding to the first and second sensor drain electrodes 144, 146 and the dummy drain electrode 148, so the reflected light goes to the exterior from the display panel. Therefore, external visibility may be enhanced. Namely, a region of the first and second sensor lines 520, 140 where a color is not displayed among the unit regions may be effectively used.

According to embodiments of the present invention, first and second sensor drain electrodes and a dummy drain electrode having the embossed shape reflect light which is incident to the display panel from the exterior. A light-blocking layer has holes removed corresponding to the first and second sensor drain electrodes and the dummy drain electrode, so the reflected light goes to the exterior from the display panel. Therefore, external visibility may be enhanced.

The foregoing is illustrative of embodiments of the present invention and is not to be construed as limiting the present invention. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of embodiments of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A display substrate comprising:
    a base substrate on which a gate line and a data line are formed;
    a first sensor line parallel with the gate line;
    a first sensor gate electrode extended from the first sensor line;
    a sensor active pattern having a plurality of island-type sub-active members, and formed on the first sensor gate electrode;
    a second sensor line parallel with the data line;
    a first sensor drain electrode formed on the sensor active pattern and extended from the second sensor line;
    a second sensor drain electrode formed on the sensor active pattern and corresponding to the first sensor gate electrode;
    a pixel electrode electrically connected to the gate line and the data line; and
    a sensor electrode part spaced apart from the pixel electrode, and electrically connecting the first and second sensor drain electrodes with each other.

2. The display substrate of claim 1, further comprising:
    a gate insulation layer covering the gate line, the first sensor line and the first sensor gate electrode; and
    a protective layer covering the data line, the second sensor line, the first sensor drain electrode and the second sensor drain electrode which are formed on the gate insulation layer, and disposed under the pixel electrode and the sensor electrode part.

3. The display substrate of claim 2, further comprising:
    a common electrode formed on the protective layer; and
    an electrode insulation layer formed on the common electrode, wherein the common electrode and the electrode insulation layer are disposed between the protective layer and the pixel electrode, and between the protective layer and the sensor electrode part.

4. The display substrate of claim 2, wherein the protective layer is a color filter layer.

5. The display substrate of claim 2, wherein the protective layer has an embossed shape.

6. The display substrate of claim 5, further comprising a second sensor gate electrode having a plurality of island-type sub-gate members corresponding to the first sensor drain electrode.

7. The display substrate of claim 6, wherein the first sensor gate electrode has a plurality of island-type sub-gate members.

8. The display substrate of claim 1, wherein:
the first sensor line comprises a first sensor main line formed along a first direction substantially parallel with the gate line and the first sensor gate electrode protruding from the first sensor main line along a second direction substantially parallel with the data line, the second direction being substantially perpendicular to the first direction; and
the second sensor line comprises a second sensor main line formed along the second direction and the first sensor drain electrode protruding from the second sensor main line along the first direction to face the first sensor gate electrode.

9. The display substrate of claim 1, wherein the sensor electrode part comprises a first sensor electrode electrically connected to the first sensor line and a second sensor electrode electrically connected to the second sensor line.

10. The display substrate of claim 9, wherein the first sensor electrode and the second sensor electrode, respectively, have at least one layer.

11. The display substrate of claim 10, further comprising a common electrode formed on the data line and insulated from the pixel electrode.

12. The display substrate of claim 11, wherein a plurality of slits is formed through the pixel electrode disposed over the common electrode to partially expose the common electrode.

13. A method for manufacturing a display substrate, the method comprising:
forming a gate line, a first sensor line parallel with the gate line and a first sensor gate electrode extended from the first sensor line;
forming a sensor active pattern having a plurality of island-type sub-active members on a base substrate on which the first sensor gate electrode is formed;
forming a second sensor line, a first sensor drain electrode and a second sensor drain electrode, the second sensor line being parallel with the data line, the first sensor drain electrode being formed on the sensor active pattern and being extended from the second sensor line, the second sensor drain electrode being formed on the sensor active pattern and corresponding to the first sensor gate electrode; and
forming a pixel electrode and a sensor electrode part, the pixel electrode being electrically connected to the gate line and the data line, the sensor electrode part electrically connecting the first and second sensor drain electrodes with each other.

14. A display panel comprising:
a display substrate comprising:
a base substrate on which a gate line and a data line are formed;
a first sensor line parallel with the gate line;
a first sensor gate electrode extended from the first sensor line;
a sensor active pattern having a plurality of island-type sub-active members, and formed on the first sensor gate electrode;
a second sensor line parallel with the data line;
a first sensor drain electrode formed on the sensor active pattern and extended from the second sensor line;
a second sensor drain electrode formed on the sensor active pattern and corresponding to the first sensor gate electrode;
a pixel electrode electrically connected to the gate line and the data line; and
a sensor electrode part spaced apart from the pixel electrode, and electrically connecting the first and second sensor drain electrodes with each other,
a counter substrate facing the display substrate; and
a liquid crystal layer disposed between the display substrate and the counter substrate.

15. The display panel of claim 14, wherein the counter substrate comprises:
a sensor protrusion protruding toward the sensor electrode part;
a sensor protrusion electrode covering the sensor protrusion; and
a light-blocking layer partially formed on the counter substrate.

16. The display panel of claim 15, wherein the sensor protrusion electrode is a transparent electrode.

17. The display panel of claim 15, wherein a plurality of holes is formed through the light-blocking layer, and an area of the counter substrate corresponding to the first sensor gate electrode and the first and second sensor drain electrodes is removed to form the holes.

18. The display panel of claim 17, further comprising a dummy part, the gate line partially extending to form the dummy part.

19. The display panel of claim 18, wherein the dummy part comprises:
a dummy gate electrode, the gate line extending to form the dummy gate electrode;
a dummy active pattern having a plurality of island-type sub-active members, and formed on the dummy gate electrode; and
a dummy drain electrode formed on the dummy active pattern.

20. The display panel of claim 19, wherein the light-blocking layer has holes which are formed by removing an area of the counter substrate corresponding to the dummy gate electrode and the dummy drain electrode.

* * * * *